US012800845B2

(12) United States Patent
Morgan et al.

(10) Patent No.: US 12,800,845 B2
(45) Date of Patent: Nov. 17, 2026

(54) METHODS AND APPARATUS TO ENABLE CUSTOMIZATION OF PIGTAIL LENGTHS OF OPTICAL CONNECTORS

(71) Applicant: Intel Corporation, Santa Clara, CA (US)

(72) Inventors: Wesley Morgan, Lake Oswego, OR (US); Feifei Cheng, Chandler, AZ (US); Divya Pratap, Hillsboro, OR (US)

(73) Assignee: Intel Foundry IP LLC, Santa Clara, CA (US)

( * ) Notice: Subject to any disclaimer, the term of this patent is extended or adjusted under 35 U.S.C. 154(b) by 184 days.

(21) Appl. No.: 17/954,172

(22) Filed: Sep. 27, 2022

(65) Prior Publication Data

US 2023/0023483 A1 Jan. 26, 2023

(51) Int. Cl.
*G02B 6/38* (2006.01)

(52) U.S. Cl.
CPC ......... *G02B 6/3825* (2013.01); *G02B 6/3831* (2013.01); *G02B 6/3839* (2013.01)

(58) Field of Classification Search
CPC ... G02B 6/3825; G02B 6/3831; G02B 6/3839
See application file for complete search history.

(56) References Cited

U.S. PATENT DOCUMENTS 3,737,833 A * 6/1973 Jerominek ............. H01R 31/00 439/493
3,740,698 A * 6/1973 Jerominek ............. H01R 12/78 439/465
3,824,529 A * 7/1974 Dorrell ................ H01R 4/2412 439/864
3,877,774 A * 4/1975 Dorrell ................ H01R 4/2412 439/409
3,934,075 A * 1/1976 Dilliplane ............ H01R 4/2495 333/260
4,160,580 A * 7/1979 Le Noane ............ G02B 6/3873 385/71
4,202,475 A * 5/1980 Hirai ........................ G02B 6/25 225/2
4,252,407 A * 2/1981 Bubanko ................ G02B 6/383 385/59
4,350,867 A * 9/1982 Kinoshita ............ G02B 6/2551 219/121.75
4,367,909 A * 1/1983 Shatto, Jr. ............ H01R 12/775 439/497
4,417,779 A * 11/1983 Wilson ................. H01R 12/714 439/325

(Continued)

*Primary Examiner* — Peter Radkowski
(74) *Attorney, Agent, or Firm* — Hanley, Flight & Zimmerman, LLC

(57) ABSTRACT

Methods, apparatus, systems, and articles of manufacture are disclosed to enable customization of pigtail lengths of optical connectors. Disclosed is an apparatus comprising an affixed fiber array unit plug including a first optical fiber, a detachable fiber array unit plug including a second optical fiber, the detachable fiber array unit plug to be removably coupled to the affixed fiber array unit plug, and guide pins to interface with both the detachable fiber array unit plug and the affixed fiber array unit plug when coupled together, the guide pins to facilitate alignment of the first optical fiber with the second optical fiber.

20 Claims, 20 Drawing Sheets

(56) References Cited

U.S. PATENT DOCUMENTS 4,537,458 A * 8/1985 Worth ................ H01R 13/6584 439/497
4,563,050 A * 1/1986 Greenwood ......... H01R 12/616 439/495
4,563,810 A * 1/1986 Adlon .................... H01R 43/01 29/749
4,668,039 A * 5/1987 Marzili ................ H01R 4/2433 439/404
4,691,977 A * 9/1987 Marzili ................ H01R 12/675 439/417
4,753,515 A * 6/1988 Sato ..................... G02B 6/3801 385/59
4,798,544 A * 1/1989 Hartman ................ H01R 43/24 439/492
4,870,637 A * 9/1989 Follett .................... H04Q 1/155 398/52
4,932,892 A * 6/1990 Hatch .................. H01R 12/675 439/417
4,943,136 A * 7/1990 Popoff ................. G02B 6/2804 385/46
4,954,213 A * 9/1990 Jos .......................... B29C 61/10 174/DIG. 8
4,971,575 A * 11/1990 Martellotti ............. H01R 12/78 439/496
4,992,058 A * 2/1991 Tanner ................. H01R 25/162 439/211
5,189,721 A * 2/1993 Sayegh ................ G02B 6/4403 385/114
5,190,471 A * 3/1993 Barile .................. H01R 12/596 439/484
5,192,833 A * 3/1993 Gibson ................ H01R 12/775 439/495
5,212,348 A * 5/1993 Gibson .................. H01R 43/28 174/76
5,214,730 A * 5/1993 Nagasawa .............. G02B 6/389 385/71
5,246,377 A * 9/1993 Kawahara ............ H01R 35/025 439/15
5,388,174 A * 2/1995 Roll ..................... G02B 6/3839 385/71
5,400,421 A * 3/1995 Takahashi ............ G02B 6/3834 385/38
5,481,069 A * 1/1996 Andresen ............. H01B 7/0869 439/495
5,553,787 A * 9/1996 Guginsky ............ H01R 12/772 D13/152
5,603,870 A * 2/1997 Roll ..................... G02B 6/3885 156/92
5,611,010 A * 3/1997 Shiino .................. G02B 6/3885 29/750
5,639,259 A * 6/1997 Wellinsky ............ H01R 12/772 439/470
5,675,681 A * 10/1997 Chiaretti .............. G02B 6/3874 385/59
6,004,042 A * 12/1999 Million ................ G02B 6/3839 385/59
6,047,716 A * 4/2000 Shimoji .................. B08B 1/165 134/201
6,080,009 A * 6/2000 Yanagihara .......... H01R 12/592 439/456
6,116,793 A * 9/2000 Finzel .................. G02B 6/3636 385/99
6,126,453 A * 10/2000 Gomez .................. H01R 24/52 439/787
6,173,097 B1 * 1/2001 Throckmorton ..... G02B 6/3846 385/71
6,379,054 B2 * 4/2002 Throckmorton ..... G02B 6/3885 385/67
6,632,023 B1 * 10/2003 Ogawa ................. G02B 6/4285 439/453
6,722,034 B2 * 4/2004 Enomoto ............... H01R 12/68 29/865
6,764,221 B1 * 7/2004 de Jong ............... G02B 6/3885 385/139
6,798,965 B2 * 9/2004 Zdinak ..................... G02B 5/18 398/83
6,832,032 B2 * 12/2004 Simmons ................. G02B 6/43 385/115
6,840,798 B2 * 1/2005 Kobayashi ............. H01R 13/04 439/607.41
6,869,305 B2 * 3/2005 Enomoto ............. H01R 43/048 439/422
6,879,765 B2 * 4/2005 Kuzma ................... G02F 1/313 359/227
6,896,422 B2 * 5/2005 Bennett .................. G02B 6/421 385/94
7,237,966 B2 * 7/2007 Quinby ................ G02B 6/3851 385/100
7,285,015 B2 * 10/2007 Helbok .................. H01R 43/24 439/499
7,333,708 B2 * 2/2008 Blackwell, Jr. ..... G02B 6/44528 385/76
7,333,709 B2 * 2/2008 Carpenter .......... G02B 6/44785 385/136
7,349,605 B2 * 3/2008 Noonan ............... G02B 6/4472 385/115
7,366,380 B1 * 4/2008 Peterson .............. G02B 6/4214 385/47
7,373,069 B2 * 5/2008 Lazo .................... G02B 6/4469 385/134
7,410,303 B2 * 8/2008 Sakurai ................ G02B 6/3865 385/78
7,512,307 B2 * 3/2009 Sakurai .............. B29D 11/0075 385/138
7,558,459 B2 * 7/2009 Carpenter ............ G02B 6/3802 385/136
7,565,055 B2 * 7/2009 Lu ........................ G02B 6/4475 430/311
7,646,958 B1 * 1/2010 Reagan ..................... G02B 6/46 385/135
7,653,282 B2 * 1/2010 Blackwell, Jr. ..... G02B 6/44528 385/134
7,785,020 B2 * 8/2010 Kim ..................... G02B 6/4246 385/88
7,871,286 B2 * 1/2011 Motohira ............... H01R 29/00 439/404
8,005,335 B2 * 8/2011 Reagan ..................... G02B 6/46 385/135
8,041,178 B2 * 10/2011 Lu ........................ G02B 6/4473 430/311
8,224,145 B2 * 7/2012 Reagan ..................... H04Q 1/14 385/135
8,317,411 B2 * 11/2012 Fujiwara .............. G02B 6/4292 385/92
8,363,993 B2 * 1/2013 Yu ........................ H04B 10/801 385/101
8,367,931 B2 * 2/2013 Emerson .................. H01R 4/70 174/84 C
8,506,178 B2 * 8/2013 Takeuchi ............. G02B 6/3802 385/100
8,506,179 B2 * 8/2013 Takeuchi ............. G02B 6/3801 385/100
8,565,571 B2 * 10/2013 Kimbrell ................ G02B 6/545 385/135
8,801,299 B2 * 8/2014 Shimotsu ............. G02B 6/4284 385/101
8,867,869 B2 * 10/2014 Steijer .................. G02B 6/4259 257/E31.127
8,992,098 B2 * 3/2015 Anderson ............ G02B 6/3882 385/100
9,033,592 B2 * 5/2015 Arao ........................ G02B 6/43 385/59
9,039,295 B2 * 5/2015 Fewkes ................ G02B 6/3861 385/80
9,052,465 B2 * 6/2015 Kewitsch ............. G02B 6/3564
9,069,143 B2 * 6/2015 Bradley ............... G02B 6/3885
9,069,144 B2 * 6/2015 Bradley ............... G02B 6/3851
9,188,753 B2 * 11/2015 Lee .......................... G02B 6/43

(56) References Cited

U.S. PATENT DOCUMENTS

| | | | | |
|---|---|---|---|---|
| 9,223,094 | B2 * | 12/2015 | Schneider | G02B 6/3885 |
| 9,229,172 | B2 * | 1/2016 | Eberle, Jr. | G02B 6/3608 |
| 9,261,654 | B2 * | 2/2016 | Murphy | G02B 6/3897 |
| 9,310,553 | B2 * | 4/2016 | Braunisch | G02B 6/4201 |
| 9,312,908 | B2 * | 4/2016 | Mooney | G06F 13/4068 |
| 9,341,786 | B1 * | 5/2016 | Gamache | G02B 6/30 |
| 9,417,418 | B2 * | 8/2016 | Eberle, Jr. | G02B 6/44715 |
| 9,435,967 | B2 * | 9/2016 | Braunisch | G02B 6/4201 |
| 9,459,420 | B2 * | 10/2016 | Droesbeke | G02B 6/3897 |
| 9,494,750 | B2 * | 11/2016 | Lee | G02B 6/3821 |
| 9,535,230 | B2 * | 1/2017 | Newbury | G02B 6/44715 |
| 9,568,685 | B2 * | 2/2017 | Bradley | G02B 6/3851 |
| 9,684,135 | B2 * | 6/2017 | Mori | H01R 24/20 |
| 9,690,053 | B2 * | 6/2017 | Bradley | G02B 6/245 |
| 9,766,414 | B2 * | 9/2017 | Marcouiller | G02B 6/3825 |
| 9,851,509 | B2 * | 12/2017 | Pfnuer | G02B 6/3652 |
| 9,874,711 | B2 * | 1/2018 | Schneider | G02B 6/4453 |
| 9,877,091 | B2 * | 1/2018 | Chen | H04J 14/025 |
| 9,952,396 | B2 * | 4/2018 | Van Cauteren | G02B 6/4447 |
| 10,012,802 | B2 * | 7/2018 | Newbury | G02B 6/3825 |
| 10,025,057 | B2 * | 7/2018 | Sano | G02B 6/4472 |
| 10,067,295 | B2 * | 9/2018 | Eberle, Jr. | G02B 6/32 |
| 10,094,989 | B2 * | 10/2018 | Murakami | G02B 6/3668 |
| 10,101,543 | B2 * | 10/2018 | Marcouiller | G02B 6/3825 |
| 10,107,967 | B1 * | 10/2018 | Butler | G02B 6/3612 |
| 10,114,181 | B2 * | 10/2018 | Lu | G02B 6/3879 |
| 10,175,430 | B2 * | 1/2019 | Levy | G02B 6/3851 |
| 10,175,431 | B2 * | 1/2019 | Lin | G02B 6/29329 |
| 10,241,275 | B2 * | 3/2019 | Li | G02B 6/3818 |
| 10,295,763 | B2 * | 5/2019 | Ho | H04B 10/40 |
| 10,317,638 | B2 * | 6/2019 | Schneider | G02B 6/3608 |
| 10,353,157 | B2 * | 7/2019 | Fortusini | G02B 6/3897 |
| 10,365,443 | B2 * | 7/2019 | Nishio | G02B 6/32 |
| 10,466,432 | B2 * | 11/2019 | Luo | G02B 6/43 |
| 10,473,866 | B2 * | 11/2019 | Newbury | G02B 6/44775 |
| 10,509,188 | B2 * | 12/2019 | Van Cauteren | G02B 6/44528 |
| 10,615,900 | B2 * | 4/2020 | Welch | H04B 10/40 |
| 10,620,382 | B2 * | 4/2020 | Eberle, Jr. | G02B 6/32 |
| 10,649,164 | B1 * | 5/2020 | Elsaadani | G02B 6/4472 |
| 10,663,687 | B1 * | 5/2020 | McCloud | G02B 6/44715 |
| 10,684,415 | B1 * | 6/2020 | Bulthuis | G02B 6/124 |
| 10,705,306 | B2 * | 7/2020 | Geens | G02B 6/4452 |
| 10,712,503 | B2 * | 7/2020 | Li | G02B 6/3893 |
| 10,732,366 | B2 * | 8/2020 | Turcotte | G02B 6/4204 |
| 10,749,603 | B2 * | 8/2020 | Sun | H01S 5/02325 |
| 10,795,086 | B2 * | 10/2020 | Matiss | G02B 6/421 |
| 10,928,588 | B2 * | 2/2021 | Sodagar | G02B 6/1225 |
| 10,955,633 | B2 * | 3/2021 | Schneider | G02B 6/3608 |
| 11,022,755 | B2 * | 6/2021 | Chen | G02B 6/4214 |
| 11,131,822 | B2 * | 9/2021 | Lockhart | G02B 6/4472 |
| 11,243,348 | B2 * | 2/2022 | Brown | G02B 6/44384 |
| 11,287,588 | B2 * | 3/2022 | Li | G02B 6/3885 |
| 11,327,255 | B1 * | 5/2022 | Huang | H04B 10/50 |
| 11,340,416 | B2 * | 5/2022 | Geens | G02B 6/3897 |
| 11,347,008 | B2 * | 5/2022 | Lu | G02B 6/3827 |
| 11,372,165 | B2 * | 6/2022 | Eberle, Jr. | G02B 6/3608 |
| 11,409,068 | B2 * | 8/2022 | Marcouiller | G02B 6/4471 |
| 11,573,389 | B2 * | 2/2023 | Schneider | G02B 6/3885 |
| 11,592,628 | B2 * | 2/2023 | Murray | G02B 6/3869 |
| 11,609,400 | B2 * | 3/2023 | Marcouiller | G02B 6/4471 |
| 11,624,876 | B2 * | 4/2023 | Bauco | G02B 6/3825 385/78 |
| 11,644,630 | B2 * | 5/2023 | Li | G02B 6/3885 385/114 |
| 11,650,373 | B2 * | 5/2023 | Canzonieri | G02B 6/3652 385/137 |
| 11,754,786 | B2 * | 9/2023 | Wu | G02B 6/255 385/24 |
| 11,808,983 | B2 * | 11/2023 | Wu | G02B 6/3849 |
| 11,846,820 | B2 * | 12/2023 | Geens | G02B 6/4452 |
| 11,886,023 | B2 * | 1/2024 | Denoyer | G02B 6/4202 |
| 11,934,025 | B2 * | 3/2024 | Cuno | G02B 6/3885 |
| 12,057,689 | B2 * | 8/2024 | Van Baelen | H02G 15/085 |
| 12,130,487 | B2 * | 10/2024 | Schneider | G02B 6/3608 |
| 12,276,858 | B2 * | 4/2025 | Marcouiller | G02B 6/4471 |
| 12,517,315 | B2 * | 1/2026 | Chen | G02B 6/4292 |
| 2001/0002220 | A1 * | 5/2001 | Throckmorton | G02B 6/3885 385/72 |
| 2002/0009266 | A1 * | 1/2002 | Zdinak | G01J 3/18 385/24 |
| 2002/0106161 | A1 * | 8/2002 | Kiani | G02B 6/43 385/53 |
| 2002/0173196 | A1 * | 11/2002 | Enomoto | H01R 43/048 439/422 |
| 2002/0181058 | A1 * | 12/2002 | Ger | H04B 10/801 398/164 |
| 2003/0031437 | A1 * | 2/2003 | Simmons | G02B 6/43 385/115 |
| 2003/0031452 | A1 * | 2/2003 | Simmons | G02B 6/3878 385/100 |
| 2003/0171032 | A1 * | 9/2003 | Kobayashi | H01R 12/00 174/359 |
| 2004/0047570 | A1 * | 3/2004 | Lo | G02B 6/3897 385/92 |
| 2004/0057673 | A1 * | 3/2004 | Kuzma | G02B 6/125 385/80 |
| 2004/0063351 | A1 * | 4/2004 | Enomoto | H01R 12/68 439/422 |
| 2004/0126069 | A1 * | 7/2004 | Jong | G02B 6/3878 385/109 |
| 2004/0161212 | A1 * | 8/2004 | Sun | G02B 6/4472 385/114 |
| 2005/0047795 | A1 * | 3/2005 | Windover | G02B 6/43 398/164 |
| 2005/0048809 | A1 * | 3/2005 | Bolen | H01R 12/592 439/67 |
| 2005/0123248 | A1 * | 6/2005 | Sakurai | G02B 6/3865 385/78 |
| 2005/0183881 | A1 * | 8/2005 | Hirata | H01B 7/0892 174/117 F |
| 2006/0067637 | A1 * | 3/2006 | Carpenter | G02B 6/44785 385/136 |
| 2006/0141812 | A1 * | 6/2006 | Chih | G11B 33/12 |
| 2006/0263034 | A1 * | 11/2006 | Sakurai | B29D 11/0075 385/147 |
| 2007/0133926 | A1 * | 6/2007 | Semmler | G02B 6/3806 385/75 |
| 2007/0263965 | A1 * | 11/2007 | Cody | G02B 6/4431 385/100 |
| 2008/0212929 | A1 * | 9/2008 | Carpenter | G02B 6/44785 385/135 |
| 2009/0010600 | A1 * | 1/2009 | Kim | G02B 6/4246 385/90 |
| 2009/0011618 | A1 * | 1/2009 | Stoyan | H01R 13/7175 439/56 |
| 2009/0098761 | A1 * | 4/2009 | Motohira | H01R 13/7175 439/391 |
| 2009/0324176 | A1 * | 12/2009 | Cheng | G02B 6/3885 385/73 |
| 2010/0054687 | A1 * | 3/2010 | Ye | H02G 11/02 248/49 |
| 2010/0326725 | A1 * | 12/2010 | Emerson | H01R 4/183 174/84 C |
| 2011/0052205 | A1 * | 3/2011 | Yu | H04B 10/801 398/142 |
| 2011/0158600 | A1 * | 6/2011 | Klimbell | G02B 6/545 174/50 |
| 2011/0229086 | A1 * | 9/2011 | Bradley | G02B 6/3871 385/129 |
| 2011/0313317 | A1 * | 12/2011 | Callicoat | A61B 5/155 600/581 |
| 2012/0060425 | A1 * | 3/2012 | Yamauchi | H02G 3/22 49/501 |
| 2012/0063718 | A1 * | 3/2012 | Steijer | G02B 6/4269 385/14 |
| 2012/0063729 | A1 * | 3/2012 | Fujiwara | G02B 6/4292 29/874 |
| 2012/0184130 | A1 * | 7/2012 | Yaguchi | H01R 12/53 439/493 |
| 2012/0219255 | A1 * | 8/2012 | Bradley | G02B 6/3861 385/129 |

(56) References Cited

U.S. PATENT DOCUMENTS

2012/0243833 A1* 9/2012 Shimotsu ................. G02B 6/42 385/77
2012/0275753 A1* 11/2012 Reinhardt ............ G02B 6/4431 156/305
2012/0328251 A1* 12/2012 Takeuchi ............. G02B 6/3802 385/98
2013/0022324 A1* 1/2013 Takeuchi ............. G02B 6/3801 385/95
2013/0064495 A1* 3/2013 Eberle, Jr. ............ G02B 6/3608 385/14
2013/0272649 A1* 10/2013 Braunisch ............ G02B 6/4261 29/831
2013/0272664 A1* 10/2013 Arao ........................ G02B 6/43 385/89
2013/0294723 A1* 11/2013 Kewitsch ............... H04Q 1/145 385/17
2014/0003771 A1* 1/2014 Isenhour ............ G02B 6/44528 385/77
2014/0105550 A1* 4/2014 Fewkes ................ G02B 6/3861 385/80
2014/0133810 A1* 5/2014 Schneider ............ G02B 6/4453 385/89
2014/0242927 A1* 8/2014 Mooney .............. G06F 13/4068 455/90.2
2014/0270655 A1* 9/2014 Lee ...................... G02B 6/4284 385/89
2015/0003790 A1* 1/2015 Wu ...................... G02B 6/3888 385/81
2015/0055927 A1* 2/2015 Reinhardt .............. G02B 6/368 385/135
2015/0063760 A1* 3/2015 Pommer .............. G02B 6/4251 385/79
2015/0247978 A1* 9/2015 Bradley ............... G02B 6/3863 156/250
2015/0247980 A1* 9/2015 Bradley ............... G02B 6/3885 29/868
2015/0260936 A1* 9/2015 Newbury ........... G02B 6/44715 29/505
2015/0293318 A1* 10/2015 Droesbeke ............. G02B 6/425 385/89
2015/0311640 A1* 10/2015 Kurachi ................. H01R 12/89 439/607.31
2015/0378112 A1* 12/2015 Marcouiller ............. G02B 6/00 385/56
2016/0050029 A1* 2/2016 Huegerich ........... G02B 6/4293 398/116
2016/0062066 A1* 3/2016 Lee ...................... G02B 6/3821 385/89
2016/0091684 A1* 3/2016 Van Cauteren ........ G02B 6/445 385/135
2016/0124166 A1* 5/2016 Braunisch ............ G02B 6/4261 156/60
2016/0154185 A1* 6/2016 Mori ........................ G02B 6/26 385/56
2016/0202438 A1* 7/2016 Bustamante ....... G02B 6/44715 385/137
2016/0223751 A1* 8/2016 Eberle, Jr. ............ G02B 6/3608
2016/0259141 A1* 9/2016 Schneider ............ G02B 6/3608
2016/0291261 A1* 10/2016 Izumi ..................... G02B 6/421
2017/0102506 A1* 4/2017 Newbury ........... G02B 6/44528
2017/0146750 A1* 5/2017 Fortusini ................ G02B 6/403
2017/0164076 A1* 6/2017 Chen .................. H04Q 11/0005
2017/0254967 A1* 9/2017 Lu ........................ G02B 6/3664
2017/0285270 A1* 10/2017 Pfnuer ..................... G02B 6/30
2018/0024294 A1* 1/2018 Wang ................... G02B 6/2558 385/78
2018/0040969 A1* 2/2018 Wu ...................... H01R 12/596
2018/0052289 A1* 2/2018 Lin .................... G02B 6/29329
2018/0081123 A1* 3/2018 Li ........................ G02B 6/3839
2018/0088287 A1* 3/2018 Marcouiller ......... G02B 6/3879
2018/0219362 A1* 8/2018 Zamora Gil ........... H05K 3/365
2018/0239100 A1* 8/2018 Schneider ............ G02B 6/3608
2018/0306995 A1* 10/2018 Van Cauteren ...... G02B 6/4278
2018/0329151 A1* 11/2018 Nishio ................. G02B 6/3809
2018/0348448 A1* 12/2018 Newbury ............. G02B 6/3885
2018/0348456 A1* 12/2018 Ho ......................... G02B 6/125
2019/0018206 A1* 1/2019 Luo .......................... G02B 6/43
2019/0052016 A1* 2/2019 Tran ..................... H01R 13/639
2019/0089461 A1* 3/2019 Sun ...................... H04B 10/506
2019/0094460 A1* 3/2019 Brusberg ............... G02B 6/403
2019/0094470 A1* 3/2019 Eberle, Jr. ............ G02B 6/3608
2019/0113680 A1* 4/2019 Sodagar ................. G02B 6/305
2019/0146168 A1* 5/2019 Turcotte ............... G02B 6/4204 385/59
2019/0165526 A1* 5/2019 Huang ................. H01R 12/774
2019/0219771 A1* 7/2019 Li ........................ G02B 6/4403
2019/0278039 A1* 9/2019 Geens ................ G02B 6/44528
2019/0334649 A1* 10/2019 Welch ................ G02B 6/12007
2019/0353863 A1* 11/2019 Schneider ............ G02B 6/3885
2019/0384007 A1* 12/2019 Matiss ................. G02B 6/1225
2020/0124798 A1* 4/2020 Chen .................... G02B 6/4214
2020/0192023 A1* 6/2020 Brown ................. G02B 6/4483
2020/0192040 A1* 6/2020 Li ........................ G02B 6/3885
2020/0249412 A1* 8/2020 Marcouiller ......... G02B 6/4403
2020/0257057 A1* 8/2020 Lu ...................... G02B 6/44515
2020/0386966 A1* 12/2020 Geens ................ G02B 6/44528
2021/0048587 A1* 2/2021 Denoyer .............. G02B 6/4202
2021/0263252 A1* 8/2021 Schneider ............ G02B 6/4453
2021/0302661 A1* 9/2021 Canzonieri .......... G02B 6/3885
2021/0302669 A1* 9/2021 Murray ................ G02B 6/4281
2021/0341678 A1* 11/2021 Butler .................. G02B 6/3628
2021/0341679 A1* 11/2021 Cuno, Jr. ............. G02B 6/4403
2021/0341691 A1* 11/2021 Sutherland ............. G02B 6/424
2022/0003941 A1* 1/2022 Bauco .................. G02B 6/3853
2022/0137296 A1* 5/2022 Wu ........................ G02B 6/381 385/96
2022/0163722 A1* 5/2022 Wu .................... G02B 6/44715
2022/0171145 A1* 6/2022 Li ........................ G02B 6/4403
2022/0252812 A1* 8/2022 Geens ................ G02B 6/44528
2022/0326466 A1* 10/2022 Marcouiller ....... G02B 6/44715
2023/0266552 A1* 8/2023 Schneider ............ G02B 6/3885 385/89
2023/0288657 A1* 9/2023 Marcouiller ......... G02B 6/3684
2024/0036279 A1* 2/2024 Chen .................... G02B 6/4292
2025/0180828 A1* 6/2025 Bickham .............. G02B 6/3809

* cited by examiner

METHODS AND APPARATUS TO ENABLE CUSTOMIZATION OF PIGTAIL LENGTHS OF OPTICAL CONNECTORS

GOVERNMENT INTEREST STATEMENT

This invention was made with Government support under Agreement No. HR0011-19-3-0003, awarded by DARPA. The Government has certain rights in the invention.

FIELD OF THE DISCLOSURE

This disclosure relates generally to optical connectors and, more particularly, to methods and apparatus to enable customization of pigtail lengths of optical connectors.

BACKGROUND

Optical connectors, such as fiber array units (FAUs), are used to optically connect an optical component to an external component/device through a series of wires or fibers. More particularly, optical FAUs can be used to connect a photonic integrated circuit (PIC) to a mechanical transfer (MT) ferrule through a series of optical fibers for externally connecting the PIC to an external component/device.

Figure 1:
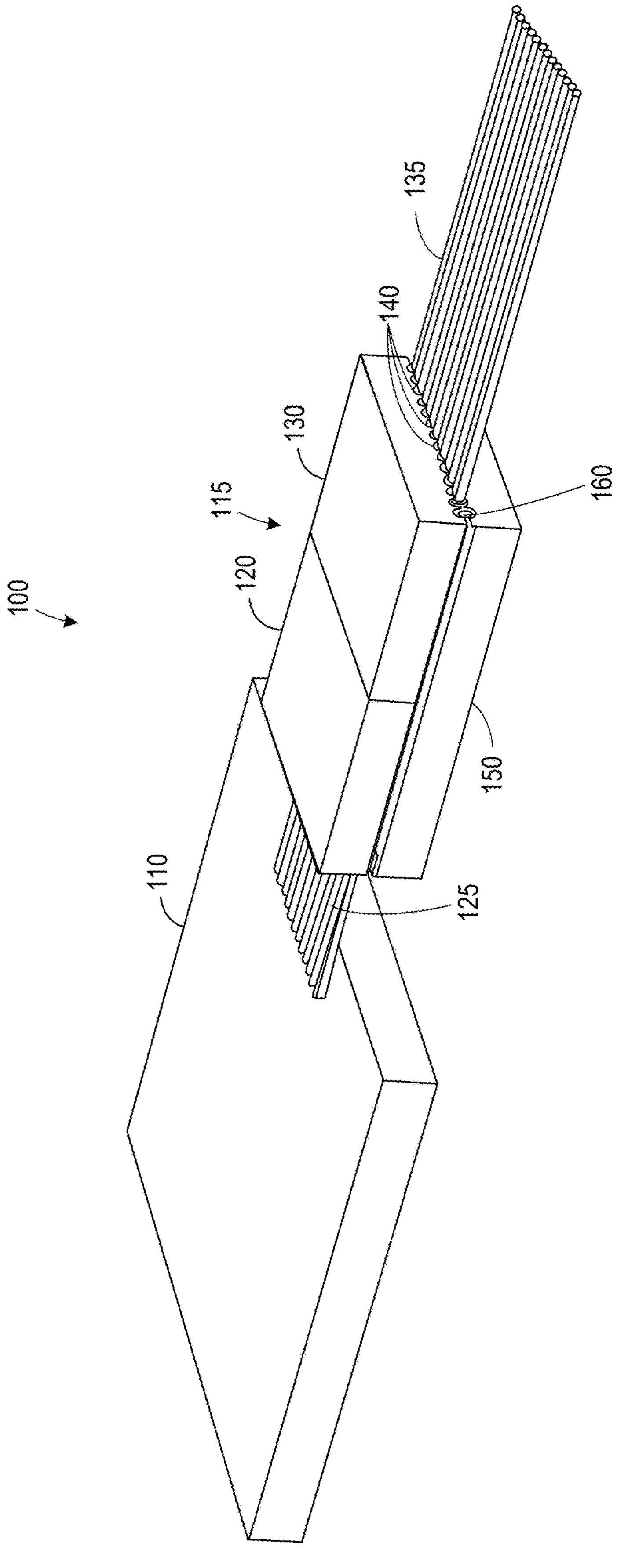
FIG. 1 is an isometric view of an example optical assembly constructed in accordance with teachings disclosed herein.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

DETAILED DESCRIPTION

FAUs commonly have fixed length dongles and are permanently attached to a PIC. These fixed length dongles provide a serious limitation where end use platforms (e.g., a computer, server systems, etc.) may ultimately need to accommodate these fixed length dongles. A simple solution is to add connections to extend the lengths to satisfy system routing requirements, but this will be costly not only in the added hardware cost but also with the additional link loss that will add cost in terms of pJ/bit of data transferred, and this additional loss may lead to other architectural limitations where link budgets are exceeded. Alternatively, since FAUs are permanently attached to the PIC, a family of various lengths and configurations needs to be produced to accommodate the variety of possible end use platforms, which would be expensive and time consuming to maintain by the electronics packaging manufacturer.

FAU dongles, also known as pigtails, take up a considerable amount of space and special accommodations are needed in handling test systems and attach equipment. These accommodations put constraints on pigtail length options for end use platforms and may limit package side egress to one or two sides. Additionally, FAU dongles that are pre-assembled to PICs are incompatible with the thermal compression bond (TCB) assembly process used to bond chips (e.g., PICs) to package substrates. Further, FAU dongles that are pre-assembled to PICs present difficulties for package ball grid array (BGA) reflow to board processes because the reflow process can deleteriously affect the connections between the FAU and the PIC. As such, attaching FAUs to high value packages has significant yield/cost risks. Therefore, there exists a need for an FAU to enable customization of pigtail lengths with increased modularity.

FIG. 1 is an isometric view of an example optical assembly 100. The example optical assembly 100 includes an optical component 110 and an FAU plug assembly 115. In this example, the FAU plug assembly 115 includes an affixed FAU plug 120, a first array of optical fibers 125, a detachable FAU plug 130, a second array of optical fibers 135, v-groove alignment slots 140, an alignment casing 150, and guide pins 160. The FAU plug assembly 115 secures the first array and second array of optical fibers 125, 135 in optical alignment. As shown in FIG. 1, the affixed FAU plug 120 is positioned adjacent the detachable FAU plug 130 with the affixed FAU plug 120 proximate the optical component 110 and the detachable FAU plug 130 distal to the optical component 110. In some examples, the optical component 110 may be a photonic integrated circuit (PIC) that is operatively coupled an external device via the first and second array of optical fibers 125, 135. In some examples, the optical fibers may be around 125 microns in diameter, the core diameter (e.g., the portion of the optical fiber that transmits the light signal) being around 10 microns in diameter.

The affixed FAU 120 and the detachable FAU 130, as their names imply, differ based on how they are attached or attachable to the optical component 110. More particularly, in some examples, the affixed FAU plug 120 permanently connects to the optical component 110 through at least the first array of optical fibers 125, with the first array of optical fibers 125 bonded to both the optical component 110 and the affixed FAU plug 120. As used herein, "permanently" and all variations thereof in the context of a connection refers to a connection that cannot be undone without damage or risk of damage to the component and/or the connected components. By contrast to the affixed FAU 120, the detachable FAU 130 can be selectively connected or removed from the optical component 110 without damage to the components involved.

The first array of optical fibers 125 includes any number of optical fibers that may be appropriate for the application, which may also include only one fiber. In some examples, the detachable FAU plug 130 connects to a user-end ferrule (such as the user-end ferrule 430 shown in FIG. 4) through at least the second array of optical fibers 135, with the second array of optical fibers 135 bonded to both the user-end ferrule and the detachable FAU plug 130. The first array of optical fibers 125 and the second array of optical fibers 135, in some examples, line up with each other with relatively high precision to form an optical connection between the respective fibers, thereby enabling optical signals to pass through the fibers 125, 135 between the optical component 110 and the user-end ferrule 430 (and, by extension, any connected external device). In some examples, the precision of the alignment between the fibers 125, 135 achieved by teachings disclosed herein is less than 1 micron of lateral offset and less than 1 degree of angular offset. Such high precision alignment provided for optical signal paths with relatively low loss (e.g., insertion loss). Furthermore, examples disclosed herein achieve this relatively high precision without the need for active alignment of the fibers (e.g., based on in situ measurements and corresponding adjustments).

The bonding of the first array of optical fibers 125 to the affixed FAU plug 120 and the bonding of the second array of optical fibers 135 to the detachable FAU plug 130 may be accomplished using any method of fiber bonding. Such methods may include dispensing epoxy on the fibers that have been previously placed inside a ferrule. However, in other examples, the fibers 125, 135 may be bonded to the FAU plugs 120, 130 before the distal end of the second array of optical fibers 135 are placed inside the user-end ferrule 430.

In some examples, the affixed FAU plug 120 and the detachable FAU plug 130 include corresponding portions of the v-groove alignment slots 140 to facilitate the positioning of the fibers 125, 135 relative to the FAU plugs 120, 130. In this manner, the v-groove alignment slots 140 facilitate the aligning of the first array of optical fibers 125 with the second array of optical fibers 135 when the affixed and detachable FAU plugs 120, 130 are positioned adjacent one another as shown in FIG. 1. In the illustrated examples, the v-groove alignment slots 140 extend in parallel between opposite ends of the FAU plugs 120, 130 and the optical fibers 125, 135 are affixed in a linear configuration along their respective FAU plug (see FIG. 3 for a cross-sectional view). In some examples, the optical fibers 125, 135 may be spaced around 250 microns between the center points of each optical fiber in the v-groove alignment slots 140. In some examples, a smaller pitch or spacing of the v-groove alignment slots 140 is possible with the pitch being slightly larger than the diameters of the optical fibers 125, 135 (e.g., a pitch as small as 126 microns may be suitable to hold the 125 micron diameter optical fibers).

In some examples, the alignment casing 150 is used to align the first array of optical fibers 125 on the affixed FAU plug 120 with the second array of optical fibers 135 on the detachable FAU plug 130. In some examples, the alignment casing 150 includes guide pins 160 for aligning with slots in the affixed FAU plug 120 and the detachable FAU plug 130 for greater alignment control over the optical fibers. That is, in some examples, the guide pins 160 are bonded to the alignment casing (e.g., within corresponding grooves) and positioned to be received within ones of the v-grooves 140 in the FAU plugs 120, 130, thereby orienting both FAU plugs 120, 130 relative to the alignment casing 150 and relative to each other. In some examples, the affixed FAU plug 120 and the detachable FAU plug 130 engage (e.g., connect, abut, adjoin, etc.) with one another such that the alignment of the optical fibers 125, 135 is maintained through the use of a retention mechanism (such as those illustrated in FIGS. 7-10 below).

In some examples, the affixed FAU plug 120 is removably coupled to the detachable FAU plug 130 via the alignment casing 150. The alignment casing 150 may be removed from the configuration to allow removal of the detachable FAU plug 130 and to allow replacement with a different (e.g., new) detachable FAU plug (not shown). This allows for different FAU pigtail lengths/combinations to be interchanged without the need to remove the entire FAU or obtain a new optical component 110.

Further, in some examples, the affixed FAU plug 120 is compatible with the package BGA reflow to board process. In such an example, the affixed FAU plug 120 can be bonded to the optical component 110 and then subjected to the BGA reflow process without destroying the FAU. In such an example, the affixed FAU plug 120 is less likely to be damaged during the BGA process since the entire FAU is not present on the optical component 110 itself.

Figure 2:
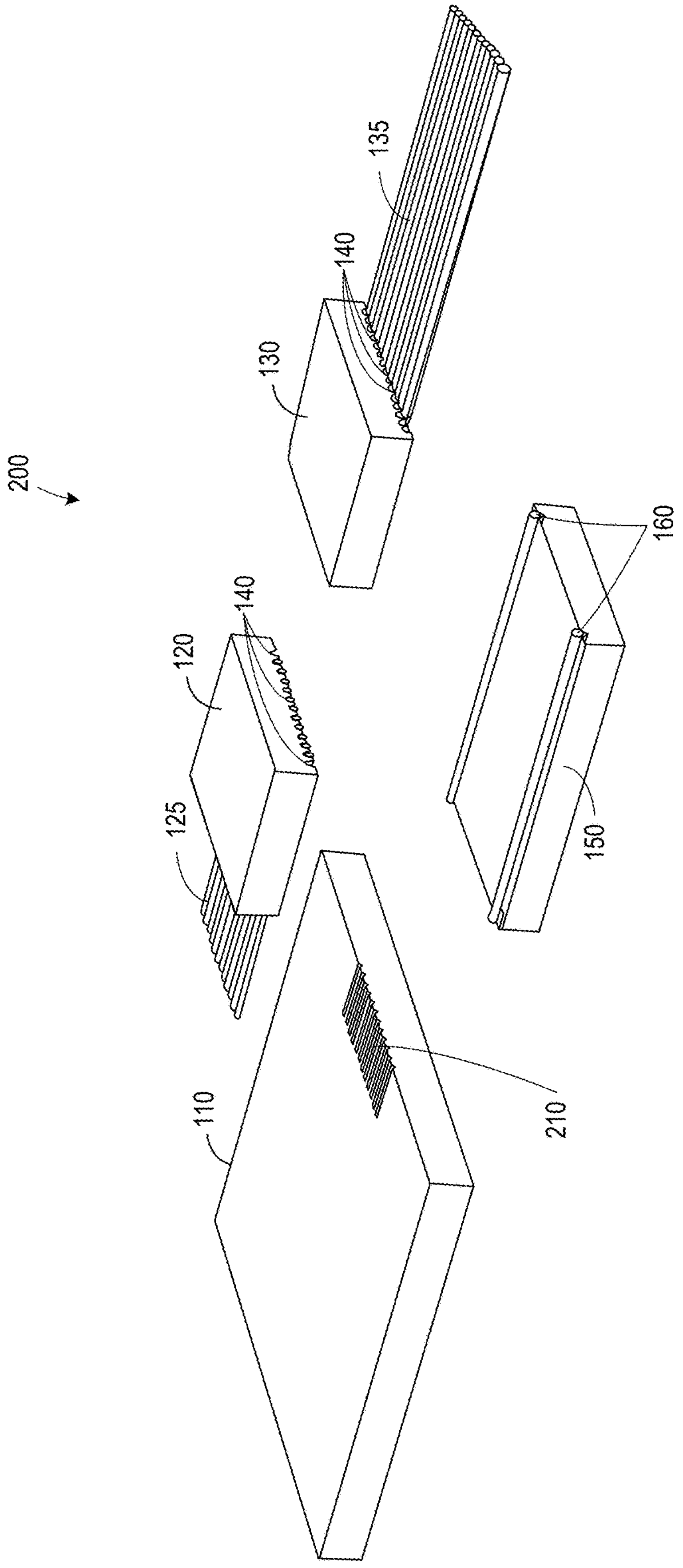
FIG. 2 is an exploded view of the optical assembly of FIG. 1.

FIG. 2 is an exploded view 200 of the example optical assembly 100 of FIG. 1. In the illustrated example of FIG. 2, the affixed FAU plug 120, the detachable FAU plug 130, and the alignment casing 150 are separated from each other and the optical component 110. In the example described herein, the first array of optical fibers 125 is bonded to the optical component 110 at an optical bonding point 210. As stated above, the affixed FAU plug 120 is compatible with the package BGA reflow to board process without destroying the affixed FAU plug 120, allowing for a more integrated assembly process of the optical component 110 with external connectors. As shown in the illustrated example, the alignment casing 150 and the associated guide pins 160 are longer than either of the FAU plugs 120, 130. More particularly, in some examples, the alignment casing 150 and the associated guide pins 160 have a length that approximately corresponds to and/or is longer than a combined length of the FAU plugs 120, 130.

Figure 3:
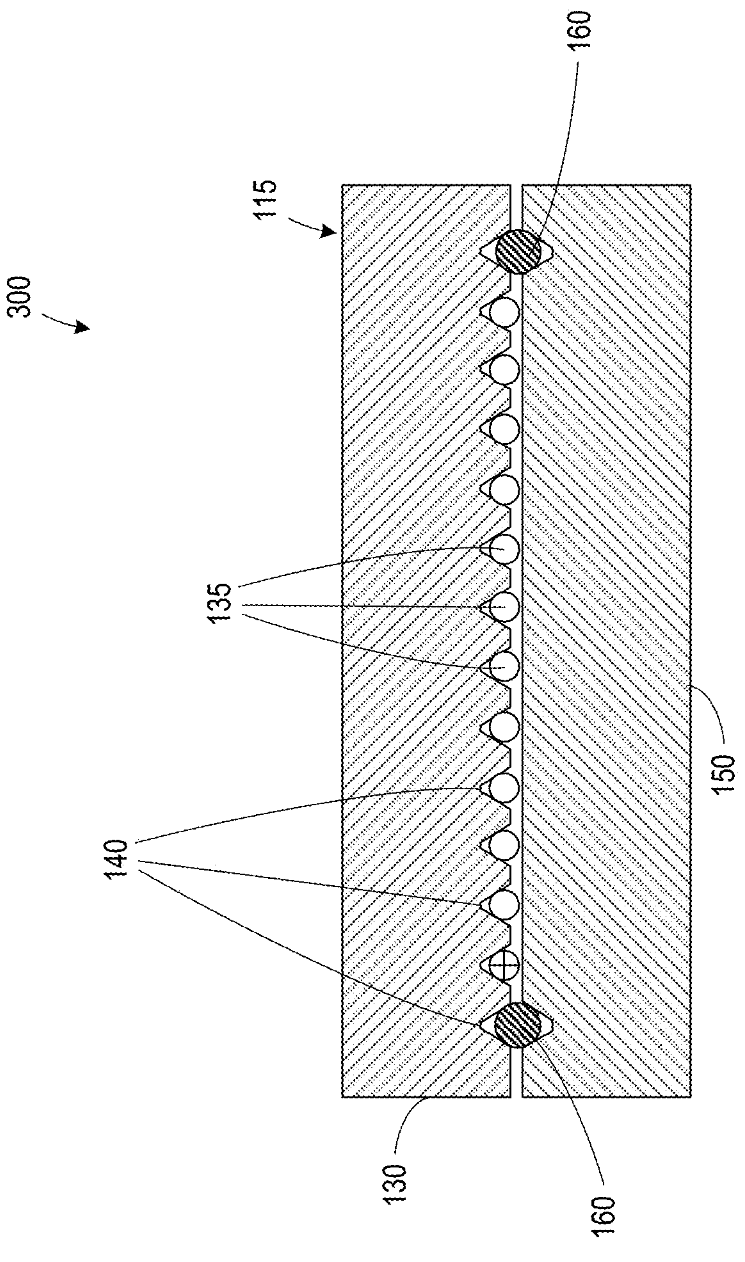
FIG. 3 is a cross-sectional view of an example fiber array unit as illustrated in FIG. 1.

FIG. 3 is a cross-sectional view 300 of the example FAU plug assembly 115 of FIG. 1. The cross-sectional view 300 illustrates the detachable FAU plug 130 with the second array of optical fibers 135 affixed in a linear configuration along the v-groove alignment slots 140. While the illustrated example of FIG. 3 illustrates the detachable FAU plug 130, the example may also be used to illustrate the affixed FAU plug 120 and the first array of optical fibers 125. The v-groove alignment slots 140 are an example means for supporting the first and second array of optical fibers 125, 135 on the affixed and detachable FAU plug 120, 130. More generally, the affixed and detachable FAU plug 120, 130 example means for supporting the first and second array of optical fibers 125, 135.

In the illustrated example of FIG. 3, the second array of optical fibers 135 are bonded to the user-end FAU plug 125 along the v-groove alignment slots 140. The alignment casing 150 includes guide pins 160, which align with ones of the v-groove alignment slots 140 in the affixed FAU plug 120 and the detachable FAU plug 130. In this example, the v-groove alignment slots 140 are positioned at the outer ends of the affixed FAU plug 120 and the detachable FAU plug 130 and do not include optical fibers. The guide pins 160 are an example means for aligning the first and second array of optical fibers 125, 135 on the affixed FAU plug 120 and the detachable FAU plug 130. Although the v-groove alignment slots 140 are shown and describes as being generally V-shaped, the grooves may be any other suitable cross-sectional shape (e.g., rectangular, semi-circular, etc.).

Figure 4A:
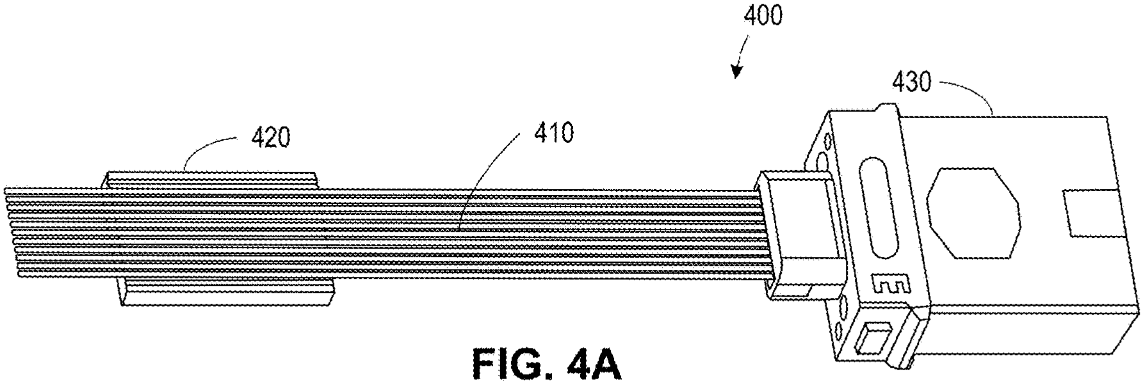
FIGS. 4A, 4B, and 4C illustrate an example optical fiber alignment and ferrule plug creation process for the example optical assembly of FIG. 1.
Figure 4B:
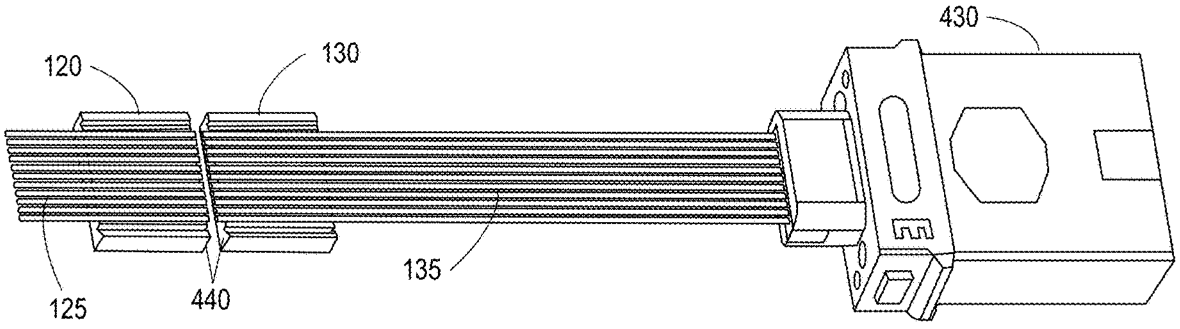
Figure 4C:
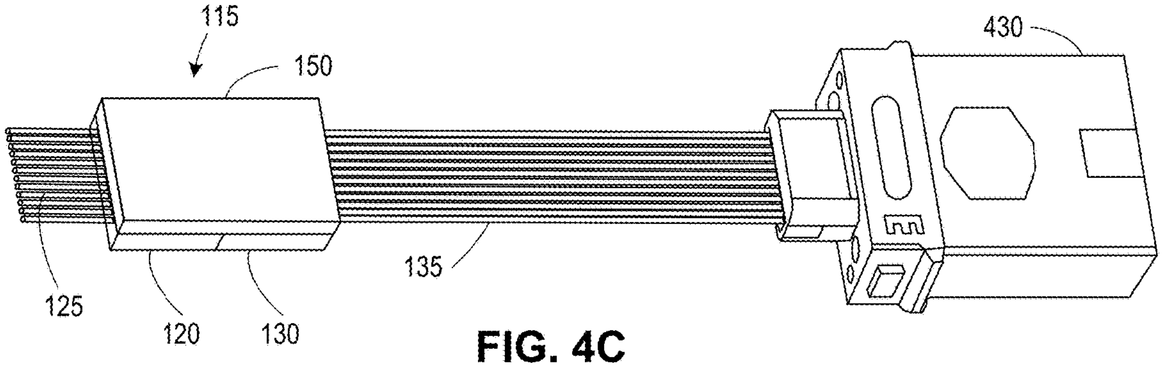

FIGS. 4A, 4B, and 4C illustrate an example optical fiber alignment and ferrule plug creation process 400 for the example optical fiber array unit of FIG. 1. The example optical fiber alignment and ferrule plug creation process 400 begins at FIG. 4A where optical fibers 410 are attached to a first ferrule 420 and attached to a user-end ferrule 430. In the illustrated example of FIG. 4A, the first ferrule 420 contains the v-groove alignment slots 140, and the optical fibers 410 are aligned in each slot in a linear configuration and then bonded to the first ferrule 410. The optical fibers 410 are likewise bonded to the user-end ferrule 430. The bonding of the optical fibers 410 to their respective ferrules may use any method of bonding optical fibers, such as using epoxy. The user-end ferrule 430 may include a mechanical transfer (MT) ferrule for interfacing with an external component/ device.

FIG. 4B represents the next operation in the example optical fiber alignment and ferrule plug creation process where the first ferrule 420 is cut to create the affixed FAU plug 120 and the detachable FAU plug 130 along with the corresponding first array and second array of optical fibers 125, 135. Providing both FAU plugs 120, 130 and the associated optical fibers 125, 135 by cutting the unitary first ferrule 420 serves to improve the alignment of the optical fibers 125, 135 when the FAU plugs 120, 130 are connected together (via the alignment casing 150). In this example, the first array of optical fibers 125 of the affixed FAU plug 120 may be bonded to the optical component 110, while the second array of optical fibers 135 of the detachable FAU plug 130 remain bonded to the user-end ferrule 430. In some examples, interfacing surfaces 440 of the affixed FAU plug 120 and the detachable FAU plug 130 may be polished flat to create a smoother alignment. Such an example may be desired to reduce link losses between the alignment of the affixed FAU plug 120 and the detachable FAU plug 130.

The example optical fiber alignment and ferrule plug creation process 400 then moves to FIG. 4C, where the alignment casing 150 is added to align the first array of optical fibers 125 with the second array of optical fibers 135. The alignment casing 150, as mentioned above, may include guide pins 160 for aligning the fibers.

In some examples, the alignment casing 150 may be attached to the affixed FAU plug 120 and/or the detachable FAU plug 130 and maintain a permanent alignment through a permanent bond, such as adhesive. In such examples, the other one of the affixed FAU plug 120 and/or the detachable FAU plug 130 is not permanently affixed to the alignment casing 150 to enable the FAU plugs 120, 130 to be selectively connected or separated. In some examples, the alignment casing 150 maintains the alignment of the optical fibers 125, 135 through a temporary or selectively couple with the FAU plugs 120, 130 using a retention/force mechanism. Example retention/force mechanisms are further explained in reference to FIGS. 7A-10B.

The example optical fiber alignment and ferrule plug creation process 400 creates a connection between the affixed FAU plug 120 and the detachable FAU plug 130, reducing link losses while still maintaining the ability to replace the detachable FAU plug 130 as described herein. Bonding the uncut optical fibers 410 to the first ferrule 420 and then cutting the first ferrule 410 to obtain the affixed FAU plug 120 and the detachable FAU plug 130 creates the relatively high precision of less than 1 micron of lateral offset and less than 1 degree of angular offset described above. In some examples, the lateral offset can be significantly less than 1 micron (e.g., +/−0.75 microns, +/−0.5 microns, +/−0.25 microns, etc.). In an example where the affixed FAU plug 120 and the detachable FAU plug 130 are created separately, the link losses across the optical fibers are greater due to possible inaccuracies in fiber bonding to the respective FAU plug. However, the replacement FAU plug still provides a reduction in link losses where the replacement FAU plug is created using the example optical fiber alignment and ferrule plug creation process 400. In some examples, after the first ferrule 420 is cut as described in reference to FIG. 4B, each of the affixed FAU plug 120 and the detachable FAU plug 130 includes a unique identifier to indicate the compatibility of the respective plugs. The plugs 120, 130 including the same unique identifiers can, in some examples, indicate a pair cut using the example optical fiber alignment and ferrule plug creation process 400, resulting in low link losses. In some examples, different plugs 120, 130, cut from different instances of the first ferrule 420, may have different identifiers to uniquely identify matching pairs. However, in some such examples, a portion of the identifier (or a separate identifier) on the plugs is the same to indicate that the different plugs (from different instances of the first ferrule plug 420) are compatible with each other, given that the plugs were created using the example optical fiber alignment and ferrule plug creation process 400. Such plugs used together will still have relatively low link losses, though the losses may not be quite as low as two plugs cut from the same first ferrule 420. In some examples, the identifiers include, but are not limited to, a serial number.

Figure 5A:
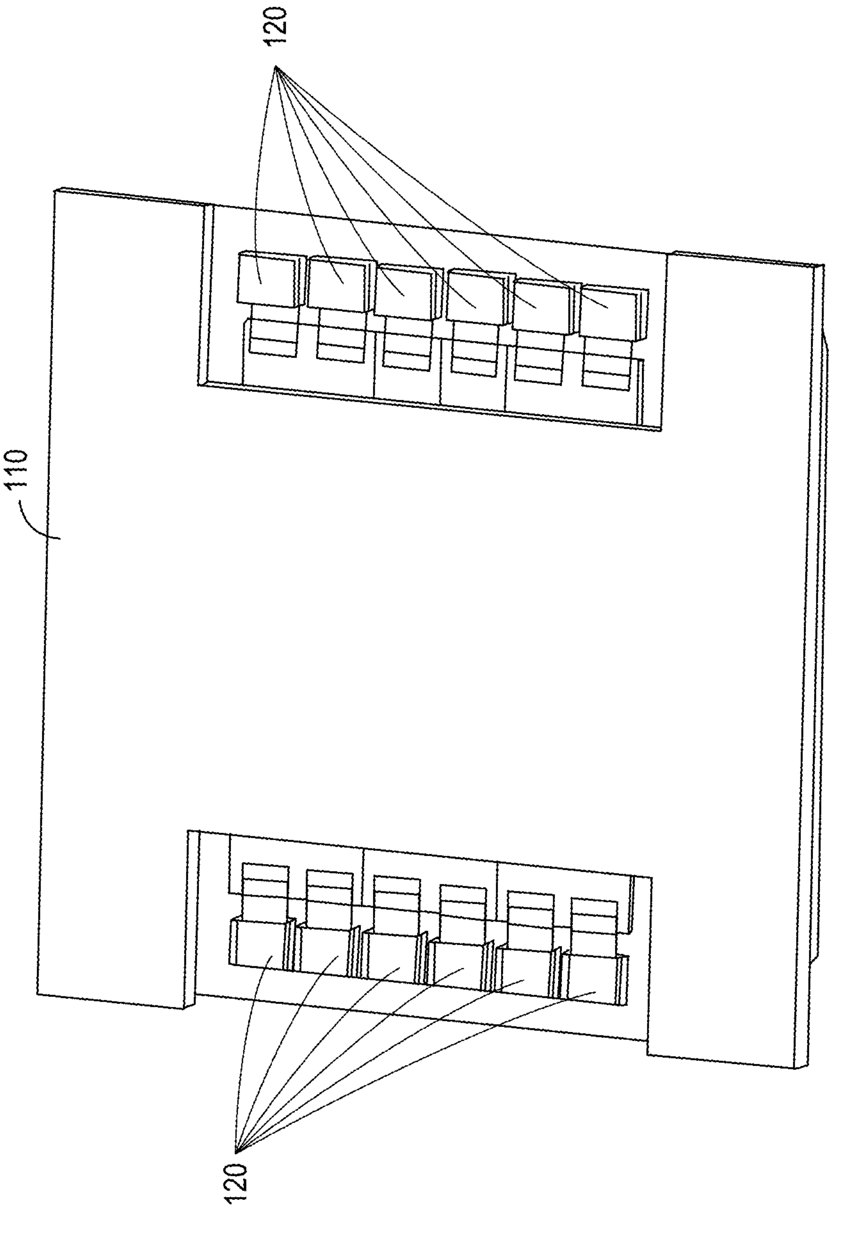
FIG. 5A shows an example optical component with several affixed fiber array unit plugs of FIG. 1 attached to the example optical component.

FIG. 5A shows an optical component 110 with multiple different affixed FAU plugs 120 attached to various portions of the optical component 110. In the illustrated example of FIG. 5A, the optical component 110, which may include a PIC, may have various connection points for an FAU to connect to. In such an example, there may be more than one affixed FAU plug 120 bonded to the optical component 110.

Figure 5B:
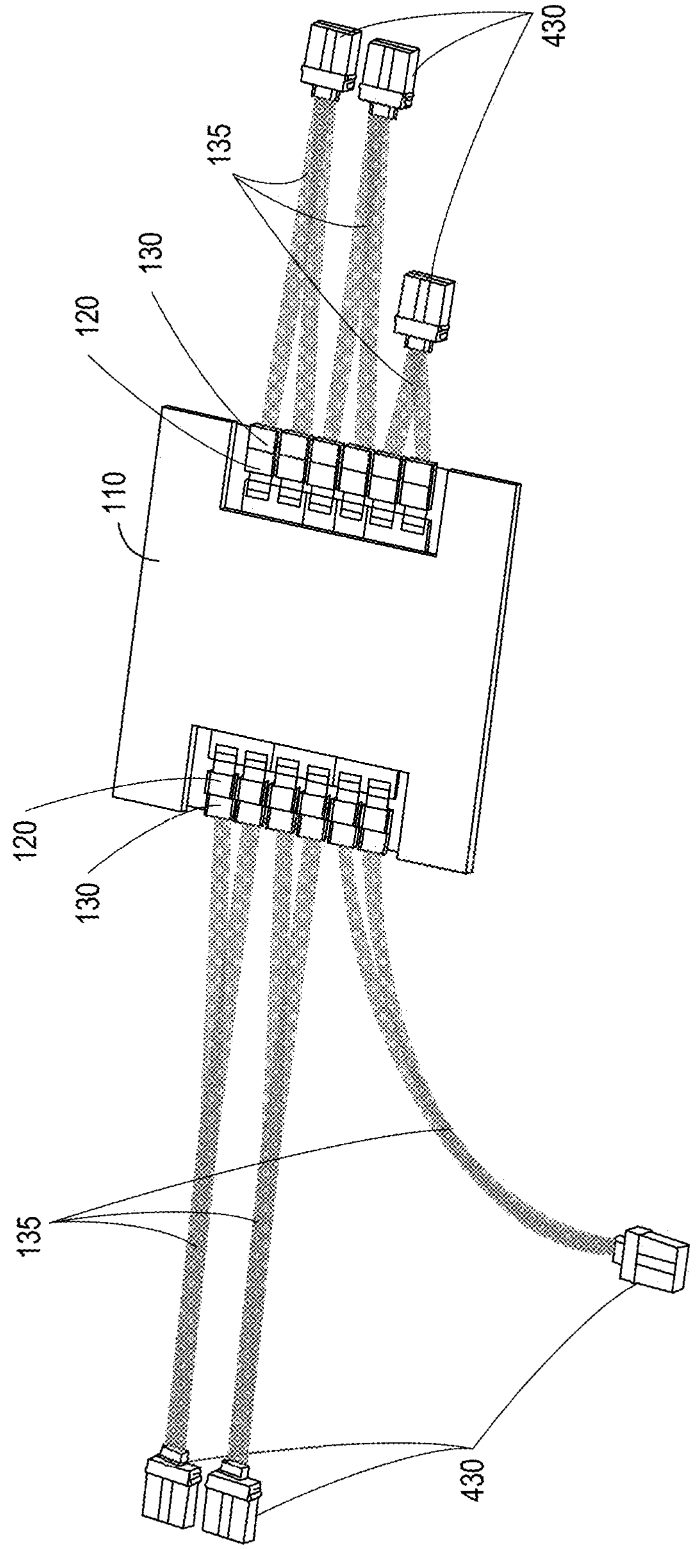
FIG. 5B shows a zoomed-out view of FIG. 5A with the example optical assembly of FIG. 1 having varying optical fiber lengths.

FIG. 5B shows a zoomed-out view of the optical component 100 of FIG. 5A with different FAU dongles or pigtails attached to different ones of the FAU plugs 120. In the illustrated example of FIG. 5B, FAU dongles of differing lengths and orientations may be attached to the affixed FAU plug 120 from FIG. 5A in any suitable arrangement, thereby enabling the customization of how the optical component 110 is connected to the external component. By using the example optical fiber alignment and ferrule plug creation process 400 of FIG. 4 the detachable FAU plugs 130 and associated dongles are replaceable and/or customizable for different purposes. For instance, a particular set or arrangement of FAU plugs 130 can be used in a testing environment of an equipment manufacturer without removing the affixed FAU plug 120 from the optical component 110. Then, an end user can use a completely different set of detachable FAU plugs 130 with different pigtail lengths when the optical component 110 is put into use. This allows for greater customization of pigtail lengths to fit the desired application.

Figure 6A:
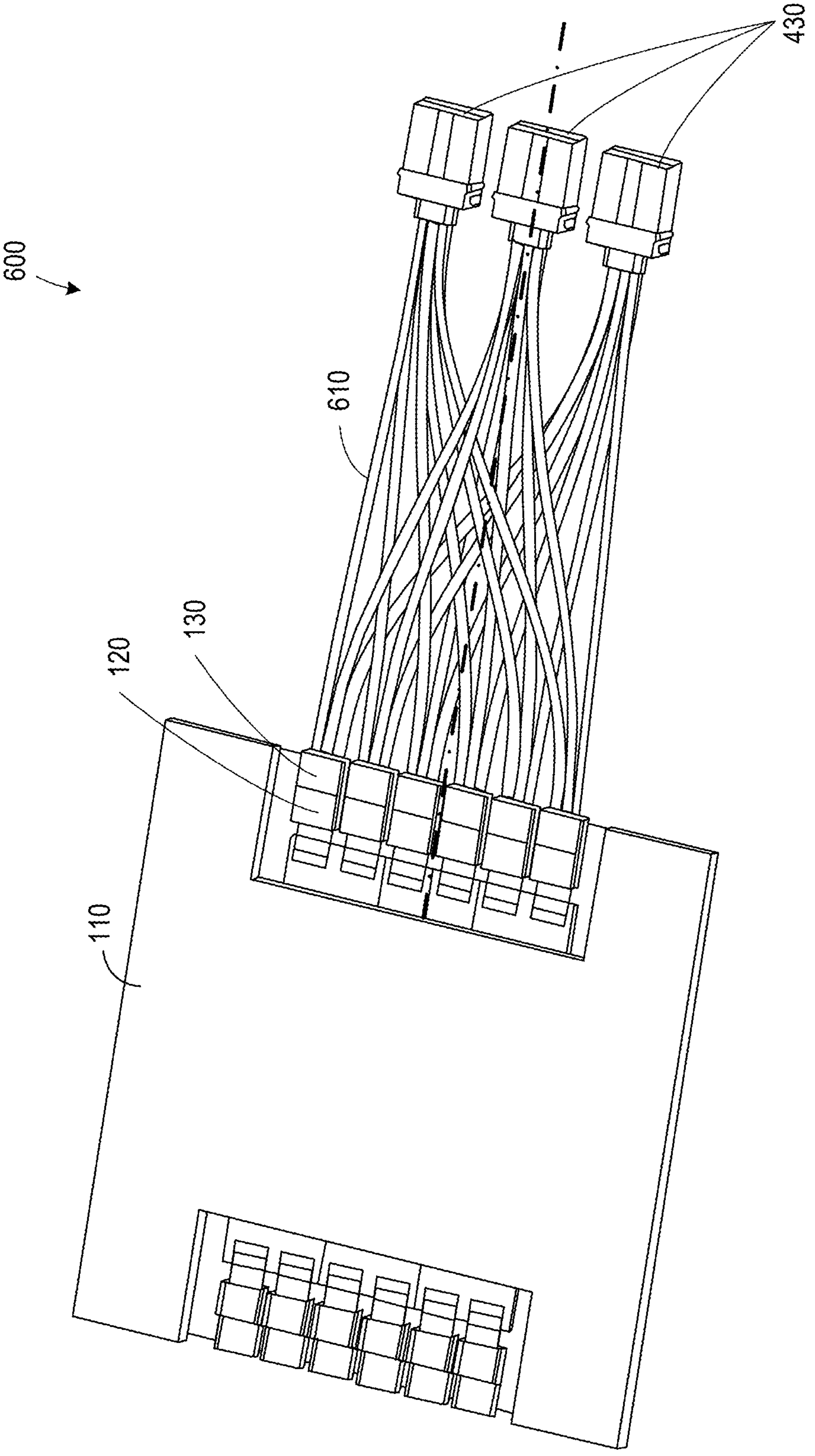
FIG. 6A shows the example optical component of FIGS. 5A and/or 5B with another example arrangement of optical fibers connected thereto.

FIG. 6A shows the optical component 110 of FIGS. 5A and/or 5B with an example arrangement 600 of optical fibers. In the illustrated example of FIG. 6A, shuffled optical fibers 610 extend outward (i.e., distally from the detachable FAU plugs 130 towards different user-end ferrules 430) and rearrange before being bonded to the user-end ferrule 430. In some examples, as shown, more than one user-end ferrule 430 may be used in the example arrangement 600, where the shuffled optical fibers 610 terminating in each user-end ferrule 430 may originate from more than one detachable FAU plug 130.

In some examples, an example testing environment may need to rearrange the shuffled optical fibers 610 to meet the needs of the example testing environment. For example, optical signals transmitted on the optical fibers exiting the detachable FAU plug 130 (e.g., the second array of optical fibers 135) may need to terminate in a non-linear position with respect to the detachable FAU plug 130 (e.g., the optical fibers are shuffled in the arrangement shown in FIG. 6A), and thus may need to be rearranged prior to being terminated in the user-end ferrule 430.

Figure 6B:
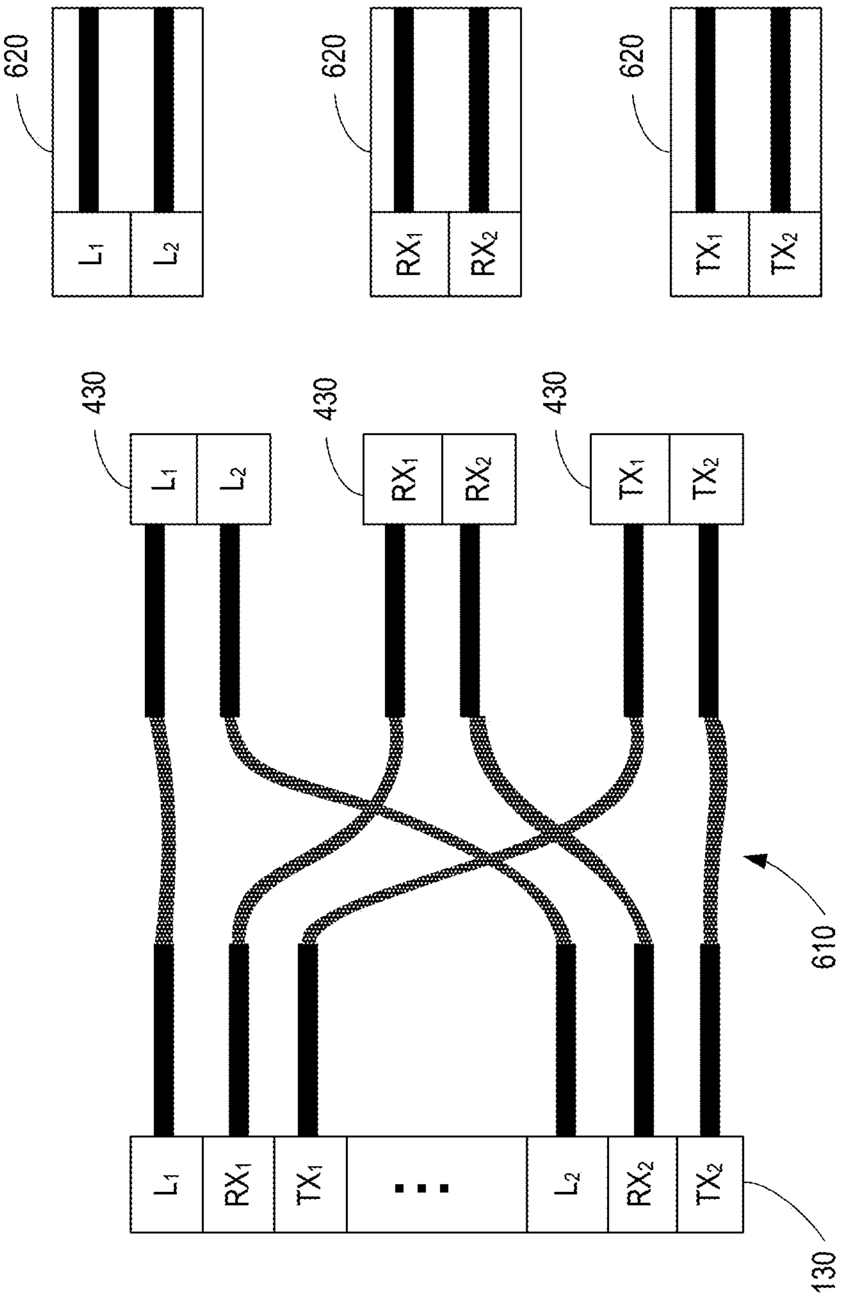
FIG. 6B is a zoomed-in schematic view of the example arrangement of optical fibers of FIG. 6A.

FIG. 6B illustrates the rearranging of the shuffled optical fibers 610 from the example arrangement 600 of FIG. 6A. As illustrated in FIG. 6B, the second array of optical fibers 135 on the detachable FAU plug 130 are linear (e.g., extend generally parallel to one another) with respect to entering the detachable FAU plug 130 (e.g., at the interfacing surface 440 of the detachable FAU plug 130). The optical fibers are then rearranged in a non-linear manner (e.g., cross over one another to be combined into different groupings) to create the shuffled optical fibers 610 and then connect to the user-end ferrule 430. In this example, the shuffled optical fibers 620 entering the user-end ferrule 430 may be lined up on corresponding to similar functionality and/or operations (e.g., $L_1$ with $L_2$, $RX_1$ with $RX_2$, etc. as shown in FIG. 6B). Such an orientation then allows the user-end ferrule 430 to connect to an external connector 620 corresponding to the function/operation performed by the grouped optical fibers. This may allow for reduction in optical fiber complexity and/or ease of grouping/organizing. Such an example may be desired where the number of shuffled optical fibers 610 connecting to external devices requires considerable time to organize/connect and/or the connection of the shuffled optical fibers 610 to the external device desires a more organized approach.

Figure 7A:
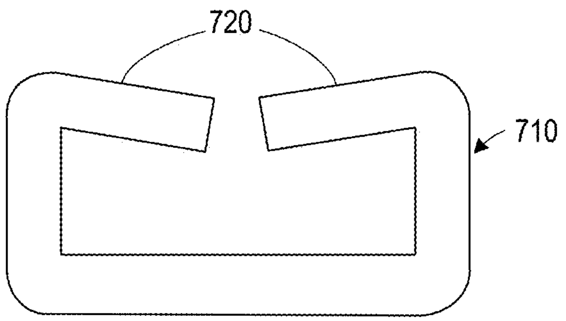
FIGS. 7A, 7B, and 7C illustrate an example retention mechanism for holding the example optical fiber array unit component of FIG. 1 together.
Figure 7B:
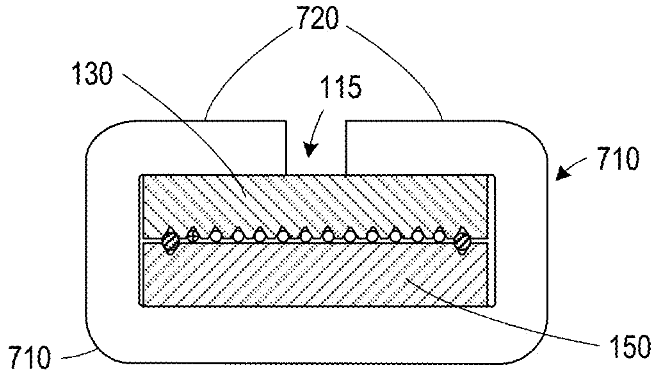
Figure 7C:
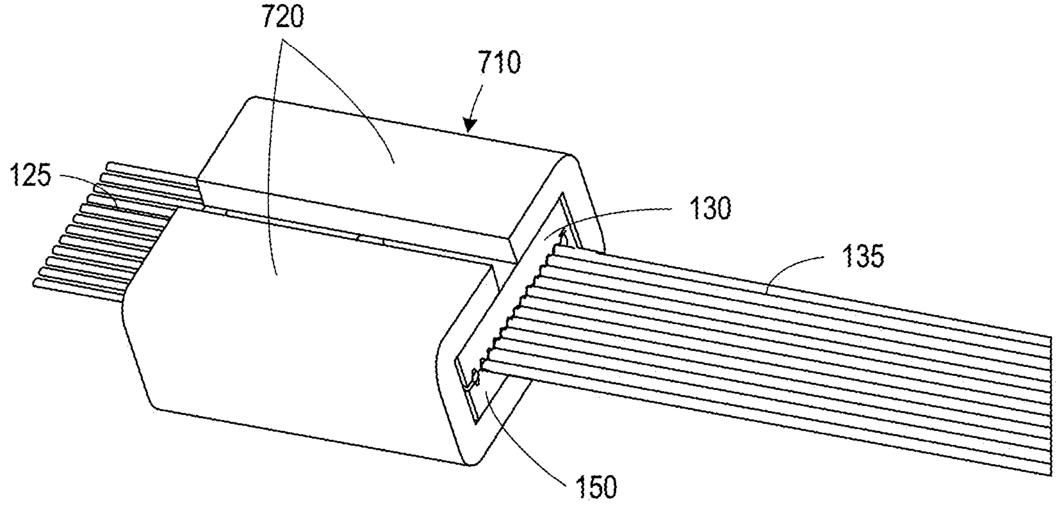

FIGS. 7A, 7B, and 7C illustrate a first example retention mechanism 710 for retaining the alignment of the first array of optical fibers 125 on the affixed FAU plug 120 with the second array of optical fibers 135 on the detachable FAU plug 130. The first retention mechanism 710 includes compression flanges 720 for providing a compressive force on the FAU plug assembly 115.

As illustrated in FIG. 7A, the first retention mechanism is in a relaxed position such that the compression flanges 720 extend inwards toward the center of the first retention mechanism 710. This configuration allows for the deformation of the compression flanges 710 (e.g., when the FAU plug assembly 115 is inserted into the first retention mechanism 710) to provide a compressive force to maintain the alignment of optical fibers.

As shown in FIG. 7B, when the example FAU plug assembly 115 is inserted into the first retention mechanism 710, the compression flanges 720 are deformed from the original relaxed position to provide the compressive force. As illustrated, the alignment casing 150 may include guide pins 160 for aiding the alignment. The guide pins 160 are held in place (within interfacing grooves in the FAU plugs 120, 130) by the compressive force applied by the compression flanges 720, thereby securing the alignment of the optical fibers 125, 135 in the FAU plugs 120, 130.

FIG. 7C shows an isometric view of the first retention mechanism 710 providing the compression force to the FAU plug assembly 115 using the compression flanges 720. As illustrated in FIG. 7C, the first retention mechanism 710 may be removed or added by sliding the first retention mechanism 710 over the example FAU plug assembly 115. The first retention mechanism 710 is an example means for retaining the guide pins 160 in the v-groove alignment slots 140.

Figure 8A:
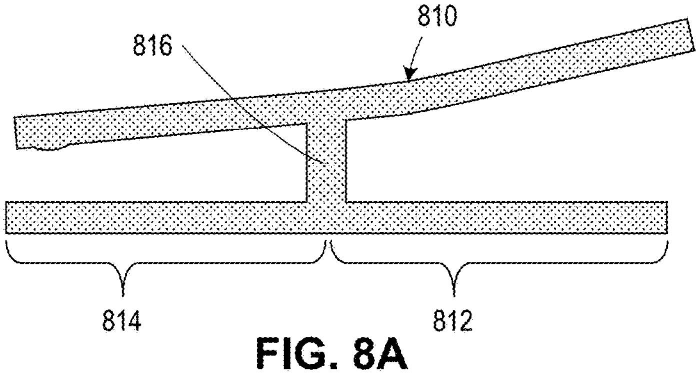
FIGS. 8A and 8B illustrate another example retention mechanism for holding the example optical fiber array unit component of FIG. 1 together.
Figure 8B:
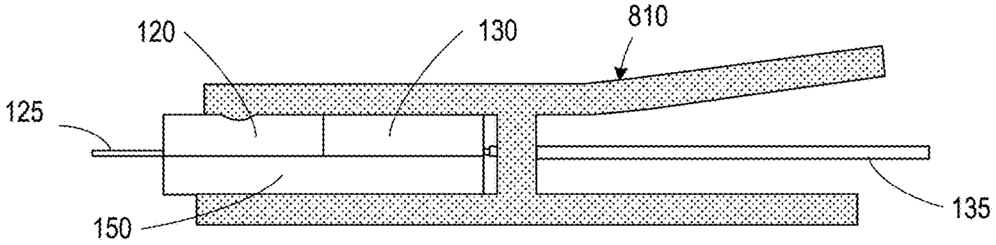

FIGS. 8A and 8B illustrate a second retention mechanism 810 for retaining the alignment of the first array of optical fibers 125 on the affixed FAU plug 120 to the second array of optical fibers 135 on the detachable FAU plug 130. As illustrated in FIG. 8A, the second retention mechanism 810 is in a relaxed position and further includes a release mechanism 812 (defined by two adjacent flanges), a compression mechanism 814 (defined by two additional adjacent flanges), and a hinge point 816.

In some examples, the second retention mechanism 810 may be deformed by squeezing the release mechanism 812, which opens the compression mechanism 814 by moving about the hinge point 816. As the compression mechanism 814 is opened, the example FAU plug assembly 115 may be inserted into the opening. Releasing the release mechanism 812 will allow the compression mechanism 814 to provide a compressive force to retain the alignment of the first array of optical fibers 125 on the affixed FAU plug 120 to the second array of optical fibers 135 on the detachable FAU plug 130.

Figure 8C:
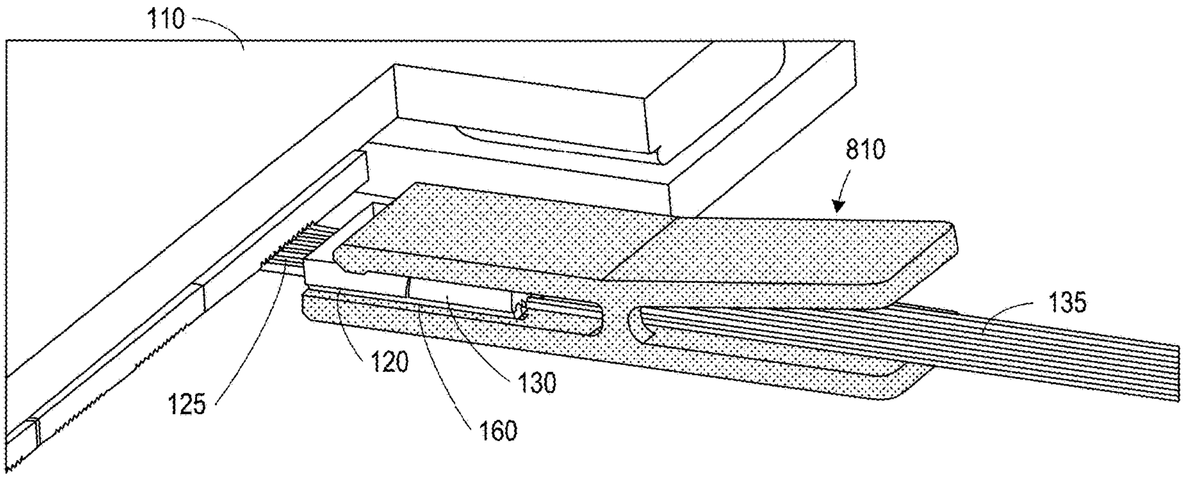
FIGS. 8C and 8D illustrate alternative examples of the example retention mechanism of FIGS. 8A and 8B.

FIG. 8C shows an alternative implementation of the second retention mechanism 810 that excludes the alignment casing 150. That is, in some examples, the second retention mechanism provides a compressive force to retain the alignment between the affixed FAU plug 120, the detachable FAU plug 130, and the alignment casing 150 (such as the examples provided in FIGS. 8A and 8B). In other examples, the second retention mechanism 810 may include the guide pins 160 without the associated alignment casing (such as the example provided in FIG. 8C). In such an example, the second retention mechanism 810 acts as both an alignment mechanism and a retention mechanism such that the alignment casing 150 is not needed to aid in the alignment of the optical fibers.

Figure 8D:
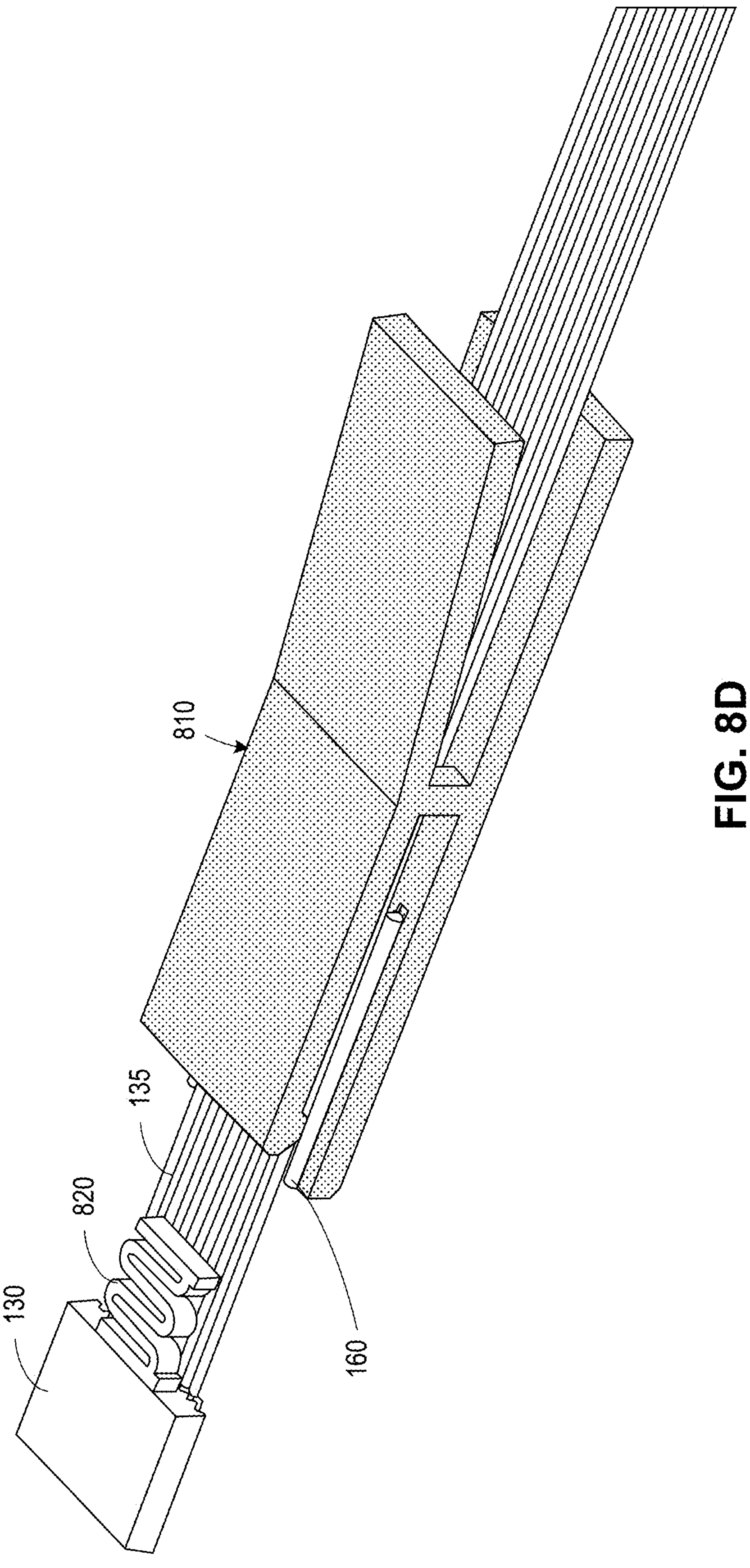

In some examples, a spring 820 may be included to the outward end of the detachable FAU plug 130 (e.g., the end facing away from the affixed FAU plug 120), as illustrated in FIG. 8D. In such an example, the spring 820 may provide an axial force to maintain the connection of the affixed FAU plug 120 and the detachable FAU plug 130. As illustrated in FIG. 8D, the second retention mechanism 810 includes the guide pins 160 (such as the example shown in FIG. 8C) for aligning the affixed FAU plug 120 to the detachable FAU plug 130. When the second retention mechanism 810 is placed over the example FAU plug assembly 115, the second retention mechanism 810 provides a compressive force to retain the connection between the FAU plugs 120, 130, and the spring 820 provides an axial force to further maintain the connection The second retention mechanism 810 is another example means for retaining the guide pins 160 in the v-groove alignment slots 140.

Figure 9A:
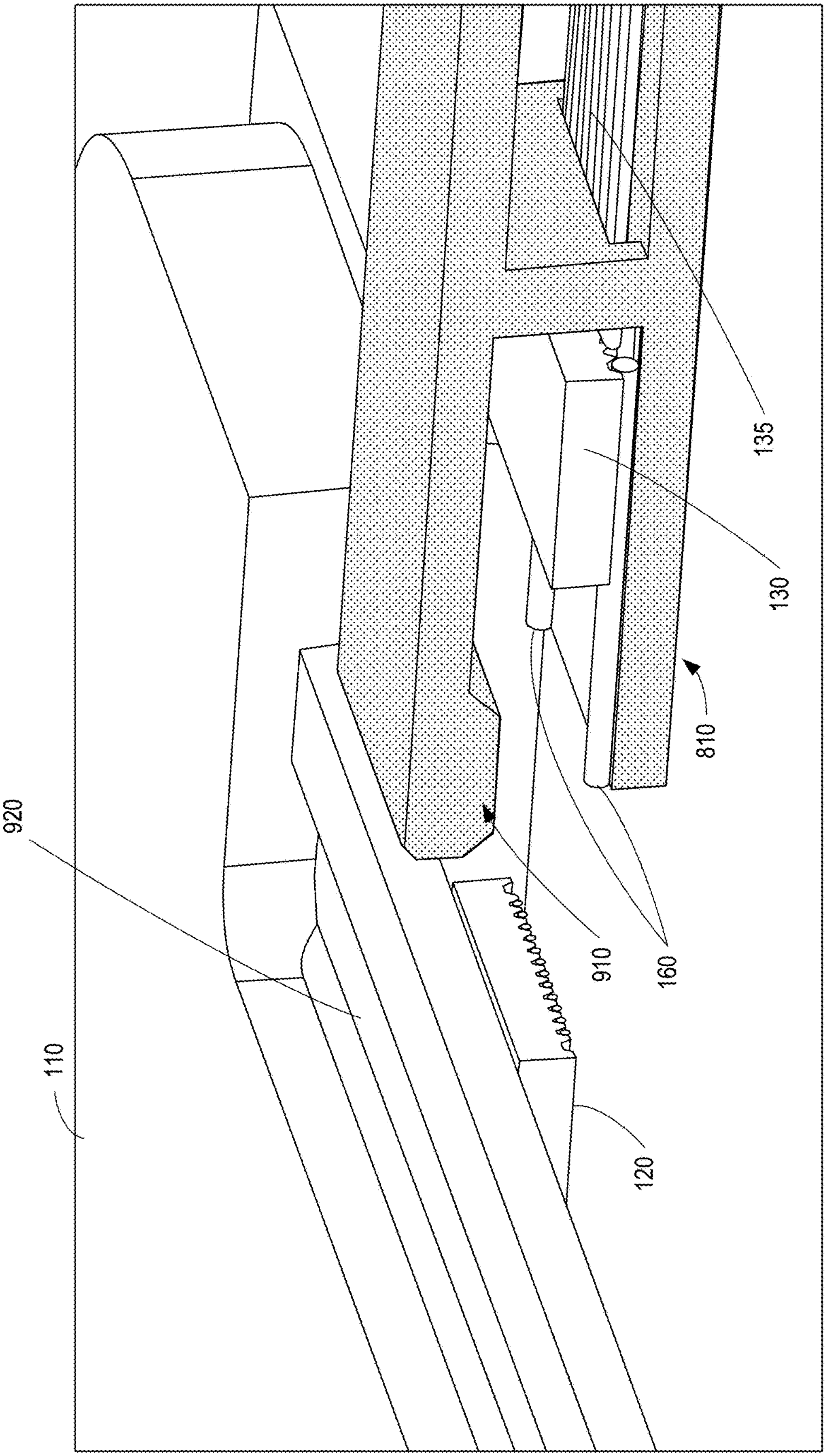
FIGS. 9A and 9B illustrate another example retention mechanism for holding the example optical fiber array unit component of FIG. 1 together.
Figure 9B:
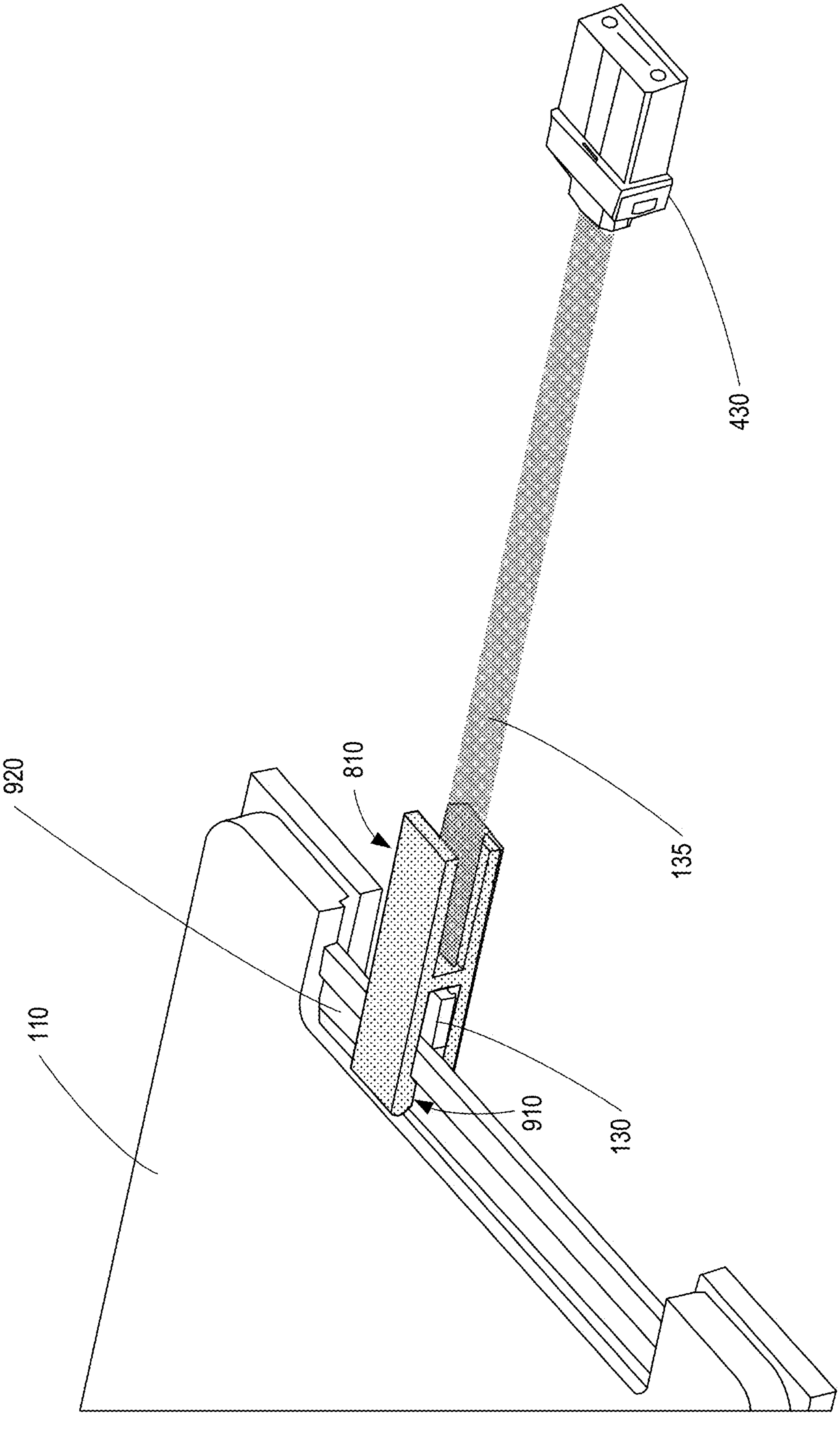

FIGS. 9A and 9B illustrate an alternative example of the second retention mechanism 810 of FIGS. 8A-8D. In the illustrated example of FIG. 9A, the second retention mechanism 810 includes a ridge or protrusion 910 which snaps/clips onto an interfacing slot 920 in the optical component 110. Providing such an attachment mechanism is helpful where the optical component 110 may be in an environment where it frequently moves and/or is shifted during operation. The ridge 910 interfacing with the slot 920 also creates a mechanism that facilitates aligning the first array of optical fibers 125 on the affixed FAU plug 120 to the second array of optical fibers 135 on the detachable FAU plug 130 by snapping/clipping onto the optical component 110 to maintain the alignment of the optical fibers.

The illustrated example of FIG. 9B shows the illustrated example second retention mechanism 810 of FIG. 9A connected to the optical component 110. As shown, the second retention mechanism 810 is snapped/clipped to the interfacing slot 920 using the ridge 910 on the second retention mechanism 810.

Figure 10A:
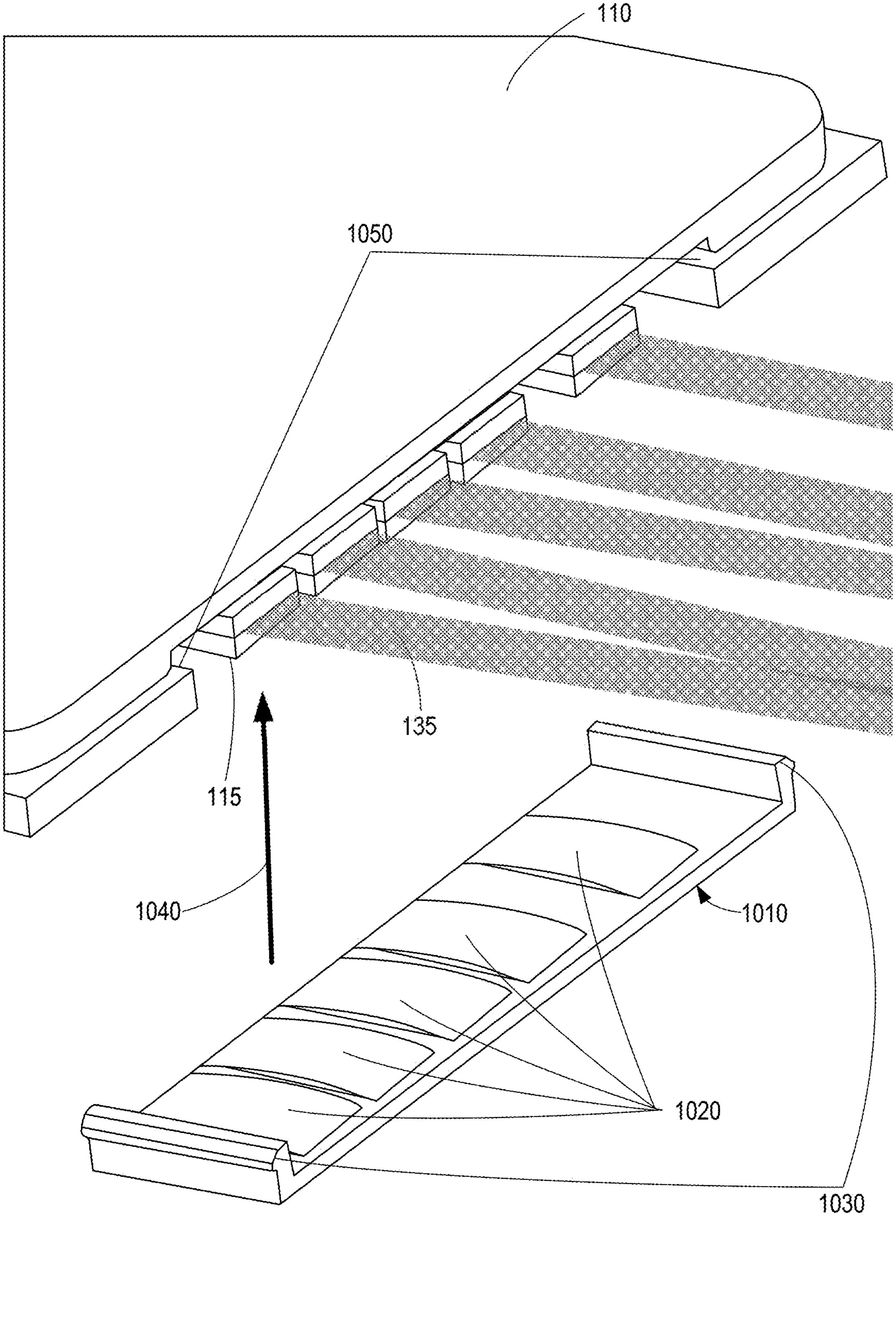
FIGS. 10A and 10B illustrate another example retention mechanism for holding the example optical fiber array unit component of FIG. 1 together.
Figure 10B:
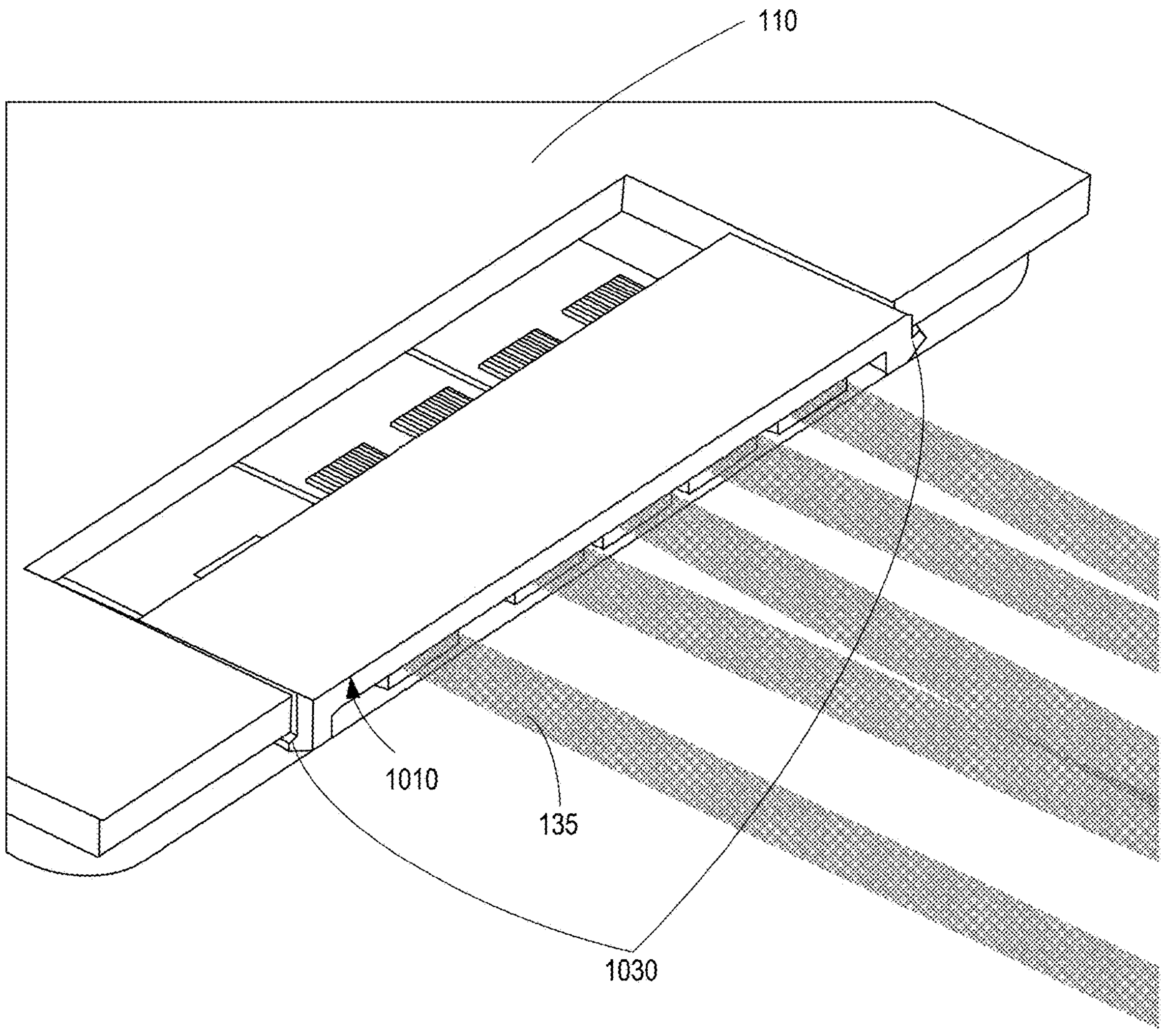

FIGS. 10A and 10B illustrate a third retention mechanism 1010 for retaining the alignment of the first array of optical fibers 125 on the affixed FAU plug 120 to the second array of optical fibers 135 on the detachable FAU plug 130. The third retention mechanism 1010 is illustrated in FIG. 10A and includes a spring 1020 and coupling clips 1030. Each spring 1020 may be placed along the third example retention mechanism 1010 at a spacing corresponding to the placement of each of the example FAU plug assembly 115 attached to the optical component 110.

In the illustrated example of FIG. 10A, the third retention mechanism 1010 is displaced towards the optical component 110 (represented by the arrow 1040) and couples to the optical component 110 by the clips 1030 interfacing with mating ridges 1050. The spring 1020 provide a compressive force acting on the FAU plug assemblies 115 to retain the alignment of the first array of optical fibers 125 on the affixed FAU plug 120 to the second array of optical fibers 135 on the detachable FAU plug 130.

FIG. 10B illustrates an alternate view of the third retention mechanism 1010 when coupled to the optical component 110. As illustrated, the third retention mechanism 1010 may interface with the mating ridges 1050 to couple to the optical component 110 using the coupling clips 1030, providing a compressive force to the example FAU plug assembly 115 to retain the alignment of the optical fibers. The third retention mechanism 1010 is yet another example means for retaining the guide pins 160 in the v-groove alignment slots 140.

Figure 11:
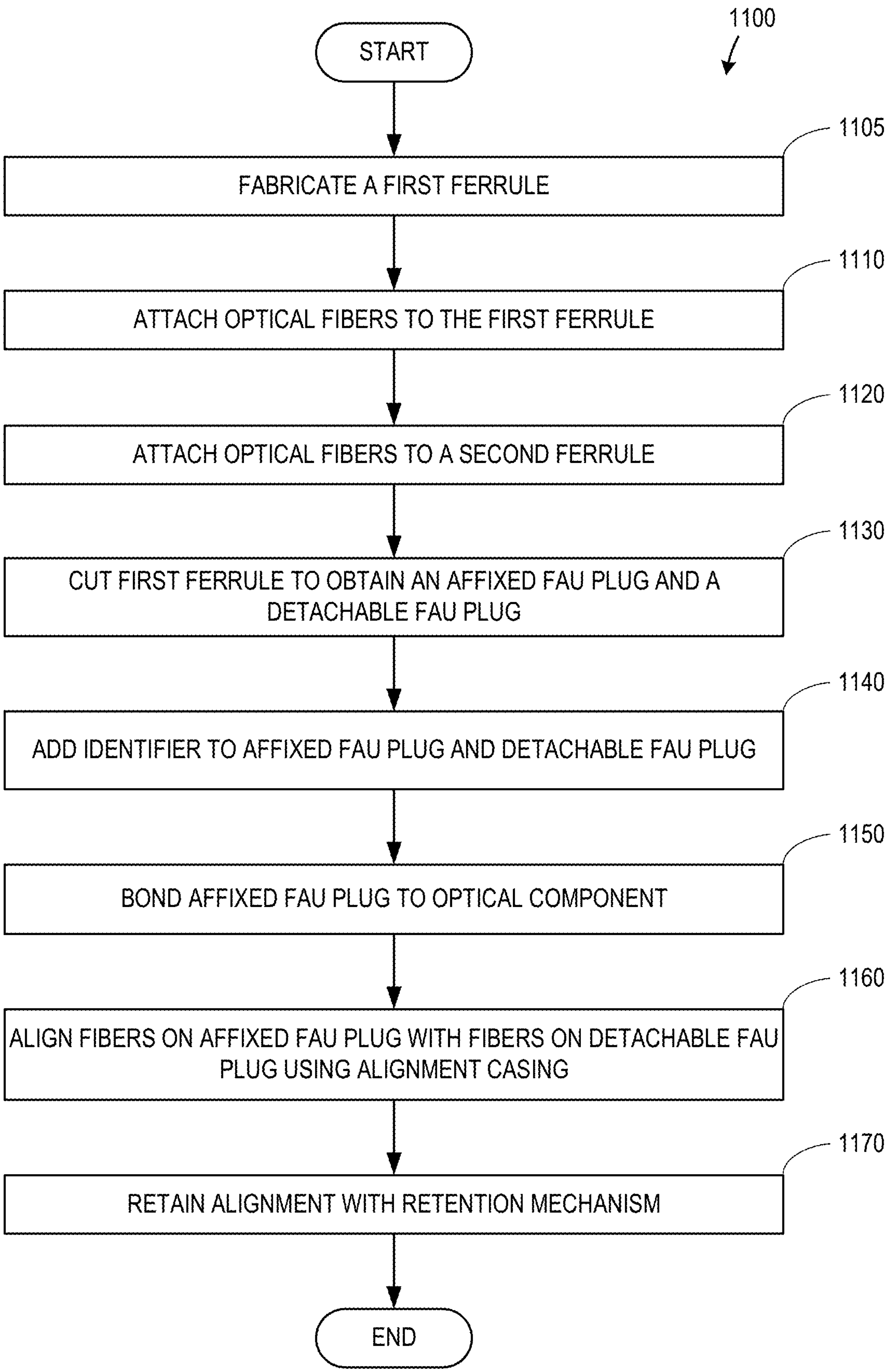
FIG. 11 is a flowchart representative of the example optical fiber alignment and ferrule plug creation process of FIGS. 4A, 4B, and/or 4C.

FIG. 11 is a flowchart representative of the example optical fiber alignment and ferrule plug creation process 400 of FIGS. 4A-4C. The example alignment and ferrule manufacturing process 1100 begins at block 1105 where a first ferrule (e.g., the first ferrule 420) is fabricated. In some examples, the first ferrule 420 can be fabricated from an injection molding process where the mold includes the v-groove alignment slots 140 for aligning the optical fibers 125, 135, 410. In other examples, the v-groove alignment slots 140 can be cut into an initially solid block. In other examples, the first ferrule 420 is fabricated through an additive manufacturing process (e.g., 3D printing). Regardless of the manufacturing process, the v-groove alignment slots 140 are fabricated to extend across the entire first ferrule 420. As a result, when the first ferrule 420 is subsequently cut and divided into both the affixed FAU 120 and the detachable FAU 130 (discussed below at block 1130), the v-groove alignment slots 140 ensure relatively high precision in the alignment of the optical fibers 125, 135 (both in terms of lateral offset as well as angular offset).

The example alignment and ferrule manufacturing process 1100 then continues at block 1110 where the optical fibers 410 are attached to the first ferrule 420. In some examples, the optical fibers 410 are attached to the first ferrule 420 through a bonding process, such as using epoxy.

The example alignment and ferrule manufacturing process 1100 then continues, at block 1120, by attaching the optical fibers 410 to a second ferrule (e.g., the user-end ferrule 430). As stated above in reference to FIG. 4A, the bonding of the optical fibers 410 to the first ferrule 420 and the user-end ferrule 430 may be accomplished using any known bonding technique, such as using epoxy. In some examples, block 1120 is performed prior to block 1110. That is, in some examples, the optical fibers are attached to the user-end ferrule 430 before being attached to the first ferrule 420. In some examples, the optical fibers 410 are connected to the second ferrule 430 such that the optical fibers 410 extend between the first and second ferrules 420, 430 in a linear configuration (e.g., extend generally parallel to one another in a side-by-side arrangement). In other examples, the optical fibers 410 extend between the first and second ferrules 420, 430 in a nonlinear configuration (e.g., cross over one another to be combined into different groupings and/or a different ordering at opposite ends of the fibers 410).

After the optical fibers 410 have been bonded to both the first ferrule 420 and the user-end ferrule 430, the example process advances to block 1130 where the first ferrule 420 is cut to obtain the affixed FAU plug 120 and the detachable FAU plug 130. As mentioned above in reference to FIG. 4B the interfacing surfaces 440 of the affixed FAU plug 120 and the detachable FAU plug 130 may be polished flat once cut.

In some examples, at block 1140, the example alignment and ferrule manufacturing process 1100 involves adding an identifier to each of the affixed FAU plug 120 and the detachable FAU plug 130. Such an identifier may include, for example, a serial number to indicate the compatibility of the respective plugs (either as a matching pair cut from the same first ferrule 420 or as plugs cut from different instances of the first ferrule). Matching two identical serial numbers may, for example, indicates a higher precision pair if minimal link losses are desired for a use platform. In some examples, the identifiers are added to the affixed FAU plug 120 and the detachable FAU plug 130 prior to cutting the first ferrule (at block 1130) and may even be added before attachment of the optical fibers to the first ferrule (at block 1110).

Next, at block 1150, the affixed FAU plug 120 is bonded to the optical component 110. In some examples, the bonding of the affixed FAU plug 120 to the optical component 110 utilizes any known method of bonding and/or aligning optical fibers to a component, such as active alignment.

At block 1160, the detachable FAU plug 130 is aligned with the affixed FAU plug 120 using the alignment casing 150. In some examples described herein, the alignment casing 150 may include guide pins 160 for aligning with the v-groove alignment slots 140 to facilitate alignment of the optical fibers in the separate FAU plugs 120, 130.

At block 1170, the alignment is retained using a retention mechanism. As described herein, in some examples, the retention mechanism may include the first retention mechanism 710, the second retention mechanism 810, the third retention mechanism 1010, and/or any other mechanism for retaining the alignment of the first array of optical fibers 125 on the affixed FAU plug 120 to the second array of optical fibers 135 on the detachable FAU plug 130. In some examples, blocks 1160 and 1170 are accomplished simultaneously such as when the retention mechanism includes guide pins 160 to facilitate the alignment without the use of an alignment casing 150.

While an example manner of implementing the example optical fiber alignment and ferrule plug creation process 400 of FIGS. 4A, 4B, and/or 4C is illustrated in FIG. 11, one or more of the blocks illustrated in the example process of FIG. 11 may be combined, divided, re-arranged, omitted, eliminated, and/or implemented in any other way.

Figure 12:
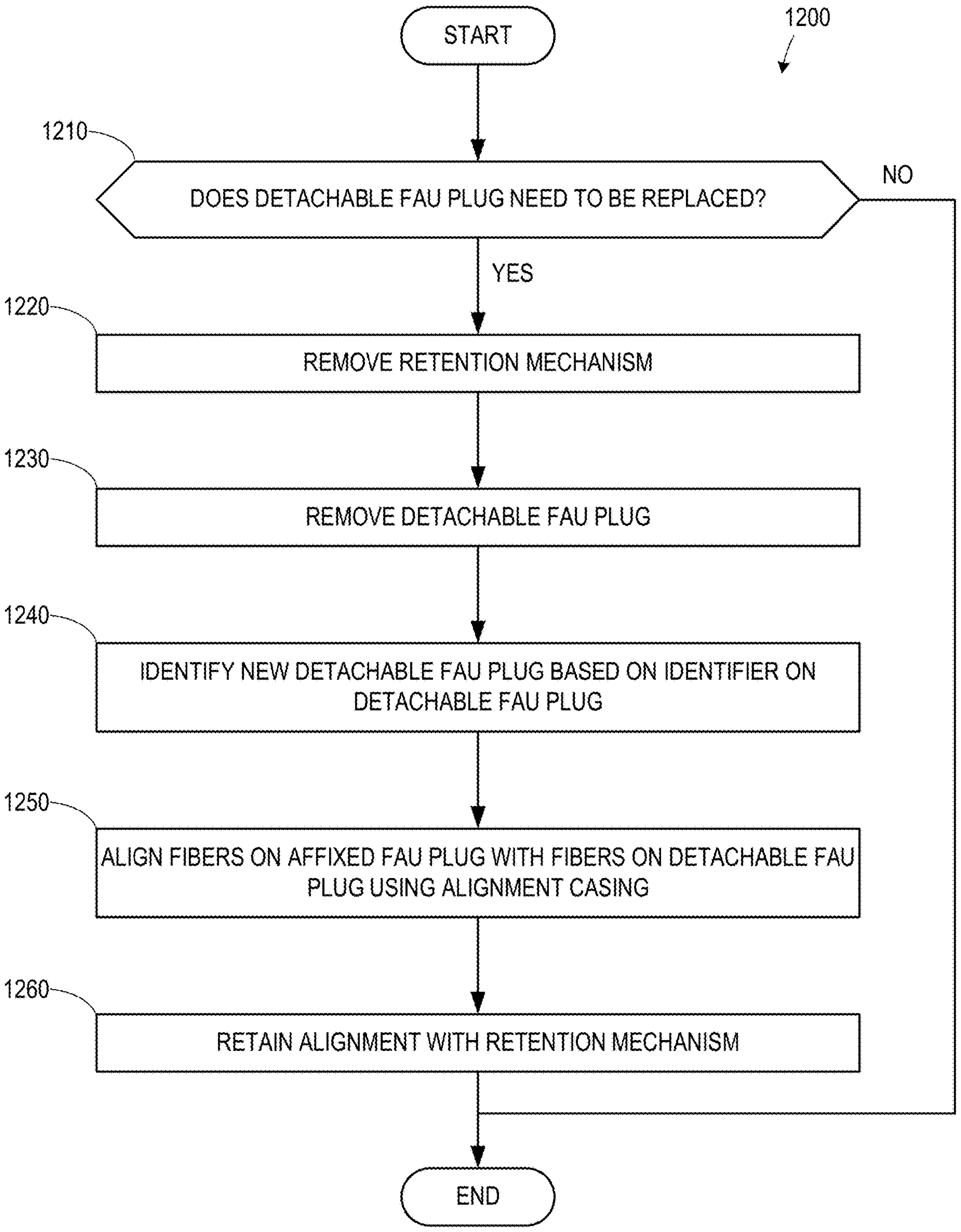
FIG. 12 is a flowchart representative of an example process for replacing a detachable end of the example optical assembly of FIG. 1.

FIG. 12 is a flowchart representative of an example detachable FAU plug replacement process 1200. The example detachable FAU plug replacement process 1200 begins at block 1210 by determining whether the detachable FAU plug 130 needs to be replaced. In some examples, it may be desirable to replace the detachable FAU plug 130 when a pigtail requiring a different length is desired for the product environment. In some examples, it may be desirable to replace the detachable FAU plug 130 when there is a deficiency in the FAU plug itself, such as an incorrect optical fiber alignment.

If the detachable FAU plug 130 is to be replaced (e.g., block 1210 returns a result of YES), the process advances to block 1220 where retention mechanism is removed. In some examples, the retention mechanism includes the first retention mechanism 710, the second retention mechanism 810, the third retention mechanism 1010, and/or any other mechanism for retaining an alignment of the first array of optical fibers 125 on the affixed FAU plug 120 to the second array of optical fibers 135 on the detachable FAU plug 130.

At block 1230, the detachable FAU plug 130 is removed. In some examples, block 1230 may also include removing the alignment casing 150 if it is present in the configuration.

In some examples, once the detachable FAU plug 130 is removed, the example detachable FAU plug replacement process 1200 advances to block 1240 to identify a new detachable FAU plug based on an identifier on the new detachable FAU plug. In some examples, the identifier may include a serial number. The serial number may be used to organize the detachable FAU plug 130 into a group based on operational or organizational characteristics, which may include number of optical fibers, optical fiber orientation, PIC compatibility, etc.

At block 1250, the new detachable FAU plug is aligned with the affixed FAU plug 120 using the alignment casing 150. In some examples described herein, the alignment casing 150 may include guide pins 160 for aligning with the v-groove alignment slots 140 to align the optical fibers therein.

At block 1260, the alignment is retained using the retention mechanism. In some examples, the retention mechanism may be removably coupled to the affixed FAU plug 120 and/or the detachable FAU plug 130. In some examples, the retention mechanism may also include the alignment casing, such as including guide pins 160.

When the retention mechanism is placed to retain the alignment or when the example detachable FAU plug replacement process 1200 determines that the detachable FAU plug 130 does not need to be replaced (e.g., block 1210 returns a result of NO), then the example detachable FAU plug replacement process 1200 ends. The example detachable FAU plug replacement process 1200 may be repeated as many times as necessary until no additional detachable FAU plug 130 are to be used.

While an example manner of implementing the example detachable FAU plug replacement process 1200 is illustrated in FIG. 12, one or more of the elements, processes, and/or devices illustrated in FIG. 12 may be combined, divided, re-arranged, omitted, eliminated, and/or implemented in any other way.

The example optical assembly 100 and the associated example retention mechanisms 710, 810, 1010 disclosed herein may be included in any suitable electronic component. FIGS. 13-17 illustrate various examples of apparatus that may include and/or be used in combination with the optical assembly 100 disclosed herein.

Figure 13:
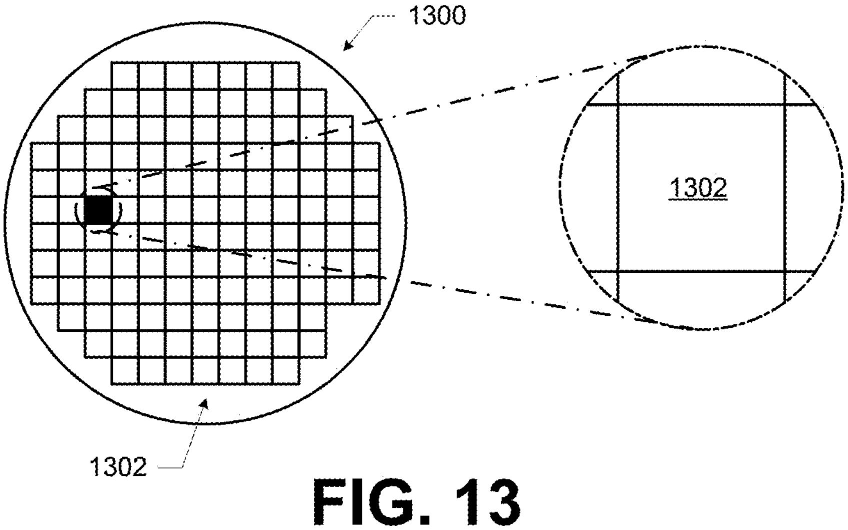
FIG. 13 is a top view of a wafer and dies that may be included in an IC package to which any of the example optical assemblies of FIGS. 1-10B may be coupled in accordance with teachings disclosed herein.

FIG. 13 is a top view of a wafer 1300 and dies 1302 that may be included in an IC package (e.g., as discussed below with reference to FIG. 15) to which an example optical assembly 100 is operatively coupled in accordance with any of the examples disclosed herein. The wafer 1300 may be composed of semiconductor material and may include one or more dies 1302 having IC structures formed on a surface of the wafer 1300. Each of the dies 1302 may be a repeating unit of a semiconductor product that includes any suitable IC. After the fabrication of the semiconductor product is complete, the wafer 1300 may undergo a singulation process in which the dies 1302 are separated from one another to provide discrete “chips” of the semiconductor product. The die 1302 may include one or more transistors (e.g., some of the transistors 1440 of FIG. 14, discussed below), supporting circuitry to route electrical signals to the transistors, passive components (e.g., signal traces, resistors, capacitors, or inductors), and/or any other IC components. In some examples, the wafer 1300 or the die 1302 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 1302. For example, a memory array formed by multiple memory devices may be formed on a same die 1302 as processor circuitry (e.g., the processor circuitry 1702 of FIG. 17) or other logic that is configured to store information in the memory devices or execute instructions stored in the memory array. IC packages disclosed herein may be manufactured using a die-to-wafer assembly technique in which some dies are attached to a wafer 1300 that include others of the dies, and the wafer 1300 is subsequently singulated.

Figure 14:
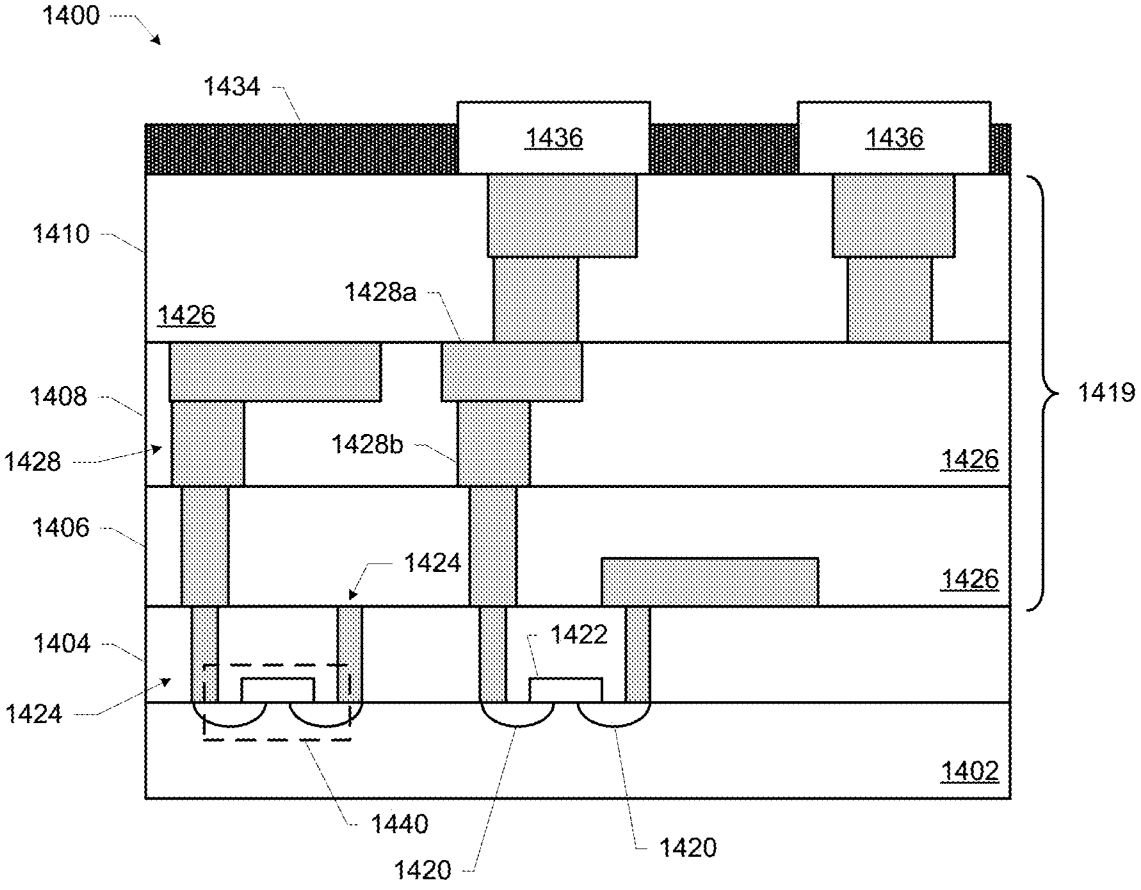
FIG. 14 is a cross-sectional side view of an IC device that may be included in an IC package to which any of the example optical assemblies of FIGS. 1-10B may be coupled in accordance with teachings disclosed herein.

FIG. 14 is a cross-sectional side view of an IC device 1400 that may be included in an IC package (e.g., as discussed below with reference to FIG. 15) to which an example optical assembly 100 is operatively coupled in accordance with any of the examples disclosed herein. One or more of the IC devices 1400 may be included in one or more dies 1302 (FIG. 13). The IC device 1400 may be formed on a die substrate 1402 (e.g., the wafer 1300 of FIG. 13) and may be included in a die (e.g., the die 1302 of FIG. 13). The die substrate 1402 may be a semiconductor substrate composed of semiconductor material systems including, for example, n-type or p-type materials systems (or a combination of both). The die substrate 1402 may include, for example, a crystalline substrate formed using a bulk silicon or a silicon-on-insulator (SOI) substructure. In some examples, the die substrate 1402 may be formed using alternative materials, which may or may not be combined with silicon, that include but are not limited to germanium, indium antimonide, lead telluride, indium arsenide, indium phosphide, gallium arsenide, or gallium antimonide. Further materials classified as group II-VI, III-V, or IV may also be used to form the die substrate 1402. Although a few examples of materials from which the die substrate 1402 may be formed are described here, any material that may serve as a foundation for an IC device 1400 may be used. The die substrate 1402 may be part of a singulated die (e.g., the dies 1302 of FIG. 13) or a wafer (e.g., the wafer 1300 of FIG. 13).

The IC device 1400 may include one or more device layers 1404 disposed on the die substrate 1402. The device layer 1404 may include features of one or more transistors 1440 (e.g., metal oxide semiconductor field-effect transistors (MOSFETs)) formed on the die substrate 1402. The device layer 1404 may include, for example, one or more source and/or drain (S/D) regions 1420, a gate 1422 to control current flow in the transistors 1440 between the S/D regions 1420, and one or more S/D contacts 1424 to route electrical signals to/from the S/D regions 1420. The transistors 1440 may include additional features not depicted for the sake of clarity, such as device isolation regions, gate contacts, and the like. The transistors 1440 are not limited to the type and configuration depicted in FIG. 14 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon and nanowire transistors.

Each transistor 1440 may include a gate 1422 formed of at least two layers, a gate dielectric and a gate electrode. The gate dielectric may include one layer or a stack of layers. The one or more layers may include silicon oxide, silicon dioxide, silicon carbide, and/or a high-k dielectric material. The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some examples, an annealing process may be carried out on the gate dielectric to improve its quality when a high-k material is used.

The gate electrode may be formed on the gate dielectric and may include at least one p-type work function metal or n-type work function metal, depending on whether the transistor 1440 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer. For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some examples, when viewed as a cross-section of the transistor 1440 along the source-channel-drain direction, the gate electrode may consist of a U-shaped structure that includes a bottom portion substantially parallel to the surface of the die substrate 1402 and two sidewall portions that are substantially perpendicular to the top surface of the die substrate 1402. In other examples, at least one of the metal layers that form the gate electrode may simply be a planar layer that is substantially parallel to the top surface of the die substrate 1402 and does not include sidewall portions substantially perpendicular to the top surface of the die substrate 1402. In other examples, the gate electrode may consist of a combination of U-shaped structures and planar, non-U-shaped structures. For example, the gate electrode may consist of one or more U-shaped metal layers formed atop one or more planar, non-U-shaped layers.

In some examples, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some examples, a plurality of spacer pairs may be used; for instance, two pairs, three pairs, or four pairs of sidewall spacers may be formed on opposing sides of the gate stack.

The S/D regions 1420 may be formed within the die substrate 1402 adjacent to the gate 1422 of each transistor 1440. The S/D regions 1420 may be formed using an implantation/diffusion process or an etching/deposition process, for example. In the former process, dopants such as boron, aluminum, antimony, phosphorous, or arsenic may be ion-implanted into the die substrate 1402 to form the S/D regions 1420. An annealing process that activates the dopants and causes them to diffuse farther into the die substrate 1402 may follow the ion-implantation process. In the latter process, the die substrate 1402 may first be etched to form recesses at the locations of the S/D regions 1420. An epitaxial deposition process may then be carried out to fill the recesses with material that is used to fabricate the S/D regions 1420. In some implementations, the S/D regions 1420 may be fabricated using a silicon alloy such as silicon germanium or silicon carbide. In some examples, the epitaxially deposited silicon alloy may be doped in situ with dopants such as boron, arsenic, or phosphorous. In some examples, the S/D regions 1420 may be formed using one or more alternate semiconductor materials such as germanium or a group III-V material or alloy. In further examples, one or more layers of metal and/or metal alloys may be used to form the S/D regions 1420.

Electrical signals, such as power and/or input/output (I/O) signals, may be routed to and/or from the devices (e.g., transistors 1440) of the device layer 1404 through one or more interconnect layers disposed on the device layer 1404 (illustrated in FIG. 14 as interconnect layers 1406-1410). For example, electrically conductive features of the device layer 1404 (e.g., the gate 1422 and the S/D contacts 1424) may be electrically coupled with the interconnect structures 1428 of the interconnect layers 1406-1410. The one or more interconnect layers 1406-1410 may form a metallization stack (also referred to as an "ILD stack") 1419 of the IC device 1400.

The interconnect structures 1428 may be arranged within the interconnect layers 1406-1410 to route electrical signals according to a wide variety of designs (in particular, the arrangement is not limited to the particular configuration of interconnect structures 1428 depicted in FIG. 14). Although a particular number of interconnect layers 1406-1410 is depicted in FIG. 14, examples of the present disclosure include IC devices having more or fewer interconnect layers than depicted.

In some examples, the interconnect structures 1428 may include lines 1428*a* and/or vias 1428*b* filled with an electrically conductive material such as a metal. The lines 1428*a* may be arranged to route electrical signals in a direction of a plane that is substantially parallel with a surface of the die substrate 1402 upon which the device layer 1404 is formed. For example, the lines 1428*a* may route electrical signals in a direction in and out of the page from the perspective of FIG. 14. The vias 1428*b* may be arranged to route electrical signals in a direction of a plane that is substantially perpendicular to the surface of the die substrate 1402 upon which the device layer 1404 is formed. In some examples, the vias **1428*b* may electrically couple lines 1428*a* of different interconnect layers 1406-1410** together.

The interconnect layers 1406-1410 may include a dielectric material 1426 disposed between the interconnect structures 1428, as shown in FIG. 14. In some examples, the dielectric material 1426 disposed between the interconnect structures 1428 in different ones of the interconnect layers 1406-1410 may have different compositions; in other examples, the composition of the dielectric material 1426 between different interconnect layers 1406-1410 may be the same.

A first interconnect layer 1406 (referred to as Metal 1 or "M1") may be formed directly on the device layer 1404. In some examples, the first interconnect layer 1406 may include lines **1428*a* and/or vias 1428*b*, as shown. The lines 1428*a* of the first interconnect layer 1406 may be coupled with contacts (e.g., the S/D contacts 1424) of the device layer 1404**.

A second interconnect layer 1408 (referred to as Metal 2 or "M2") may be formed directly on the first interconnect layer 1406. In some examples, the second interconnect layer 1408 may include vias **1428*b* to couple the lines 1428*a* of the second interconnect layer 1408 with the lines 1428*a* of the first interconnect layer 1406. Although the lines 1428*a* and the vias 1428*b* are structurally delineated with a line within each interconnect layer (e.g., within the second interconnect layer 1408) for the sake of clarity, the lines 1428*a* and the vias 1428*b*** may be structurally and/or materially contiguous (e.g., simultaneously filled during a dual-damascene process) in some examples.

A third interconnect layer 1410 (referred to as Metal 3 or "M3") (and additional interconnect layers, as desired) may be formed in succession on the second interconnect layer 1408 according to similar techniques and configurations described in connection with the second interconnect layer 1408 or the first interconnect layer 1406. In some examples, the interconnect layers that are "higher up" in the metallization stack 1419 in the IC device 1400 (i.e., further away from the device layer 1404) may be thicker.

The IC device 1400 may include a solder resist material 1434 (e.g., polyimide or similar material) and one or more conductive contacts 1436 formed on the interconnect layers 1406-1410. In FIG. 14, the conductive contacts 1436 are illustrated as taking the form of bond pads. The conductive contacts 1436 may be electrically coupled with the interconnect structures 1428 and configured to route the electrical signals of the transistor(s) 1440 to other external devices. For example, solder bonds may be formed on the one or more conductive contacts 1436 to mechanically and/or electrically couple a chip including the IC device 1400 with another component (e.g., a circuit board). The IC device 1400 may include additional or alternate structures to route the electrical signals from the interconnect layers 1406-1410; for example, the conductive contacts 1436 may include other analogous features (e.g., posts) that route the electrical signals to external components.

Figure 15:
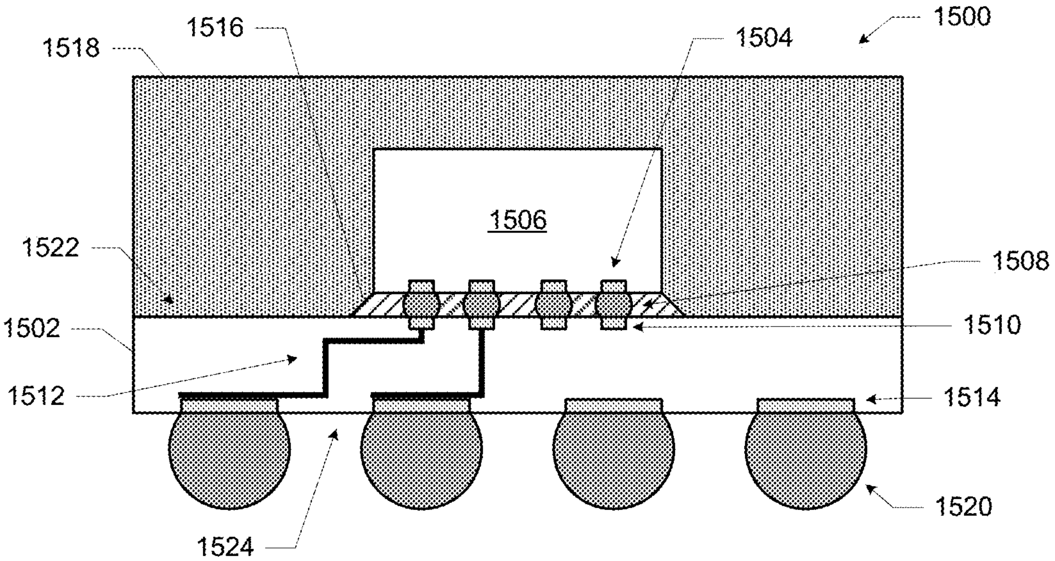
FIG. 15 is a cross-sectional side view of an IC package to which any of the example optical assemblies of FIGS. 1-10B may be coupled in accordance with teachings disclosed herein.

FIG. 15 is a cross-sectional view of an example IC package 1500 that may be included in and/or operatively coupled to an example optical assembly 100. The package substrate 1502 may be formed of a dielectric material, and may have conductive pathways extending through the dielectric material between upper and lower faces 1522, 1524, or between different locations on the upper face 1522, and/or between different locations on the lower face 1524. These conductive pathways may take the form of any of the interconnects 1428 discussed above with reference to FIG. 14.

The IC package 1500 may include a die 1506 coupled to the package substrate 1502 via conductive contacts 1504 of the die 1506, first-level interconnects 1508, and conductive contacts 1510 of the package substrate 1502. The conductive contacts 1510 may be coupled to conductive pathways 1512 through the package substrate 1502, allowing circuitry within the die 1506 to electrically couple to various ones of the conductive contacts 1514 (or to other devices included in the package substrate 1502, not shown). The first-level interconnects 1508 illustrated in FIG. 15 are solder bumps, but any suitable first-level interconnects 1508 may be used. As used herein, a "conductive contact" may refer to a portion of conductive material (e.g., metal) serving as an electrical interface between different components; conductive contacts may be recessed in, flush with, or extending away from a surface of a component, and may take any suitable form (e.g., a conductive pad or socket).

In some examples, an underfill material 1516 may be disposed between the die 1506 and the package substrate 1502 around the first-level interconnects 1508, and a mold compound 1518 may be disposed around the die 1506 and in contact with the package substrate 1502. In some examples, the underfill material 1516 may be the same as the mold compound 1518. Example materials that may be used for the underfill material 1516 and the mold compound 1518 are epoxy mold materials, as suitable. Second-level interconnects 1520 may be coupled to the conductive contacts 1514. The second-level interconnects 1520 illustrated in FIG. 15 are solder balls (e.g., for a ball grid array arrangement), but any suitable second-level interconnects 1520 may be used (e.g., pins in a pin grid array arrangement or lands in a land grid array arrangement). The second-level interconnects 1520 may be used to couple the IC package 1500 to another component, such as a circuit board (e.g., a motherboard), an interposer, or another IC package, as known in the art and as discussed below with reference to FIG. 15.

In FIG. 15, the IC package 1500 is a flip chip package. The die 1506 may take the form of any of the examples of the die 1302 discussed herein (e.g., may include any of the examples of the IC device 1400).

Although the IC package 1500 illustrated in FIG. 15 is a flip chip package, other package architectures may be used. For example, the IC package 1500 may be a ball grid array (BGA) package, such as an embedded wafer-level ball grid array (eWLB) package. In another example, the IC package 1500 may be a wafer-level chip scale package (WLCSP) or a panel fanout (FO) package. Although a single die 1506 is illustrated in the IC package 1500 of FIG. 15, an IC package 1500 may include multiple dies 1506. An IC package 1500 may include additional passive components, such as surface-mount resistors, capacitors, and inductors disposed on the first face 1522 or the second face 1524 of the package substrate 1502. More generally, an IC package 1500 may include any other active or passive components known in the art.

Figure 16:
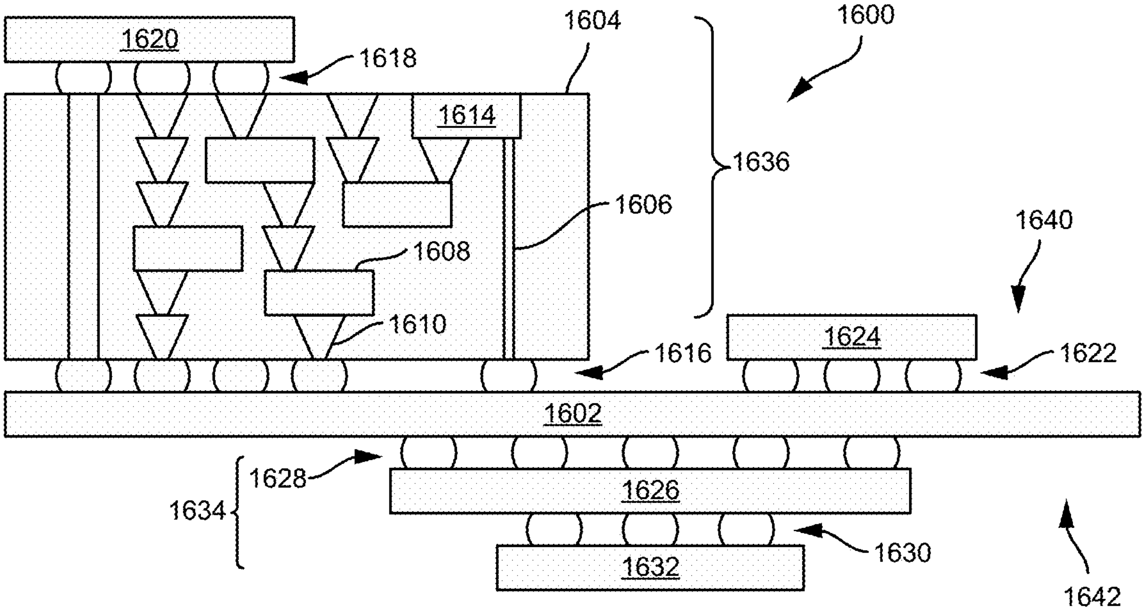
FIG. 16 is a cross-sectional side view of an IC device assembly that may include an example optical assembly constructed in accordance with teachings disclosed herein.

FIG. 16 is a cross-sectional side view of an IC device assembly 1600 that may include an/or be coupled to the optical assembly 100 disclosed herein. The IC device assembly 1600 includes a number of components disposed on a circuit board 1602 (which may be, for example, a motherboard). The IC device assembly 1600 includes components disposed on a first face 1640 of the circuit board 1602 and an opposing second face 1642 of the circuit board 1602; generally, components may be disposed on one or both faces 1640 and 1642.

In some examples, the circuit board 1602 may be a printed circuit board (PCB) including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 1602. In other examples, the circuit board 1602 may be a non-PCB substrate.

The IC device assembly 1600 illustrated in FIG. 16 includes a package-on-interposer structure 1636 coupled to the first face 1640 of the circuit board 1602 by coupling components 1616. The coupling components 1616 may electrically and mechanically couple the package-on-interposer structure 1636 to the circuit board 1602, and may include solder balls (as shown in FIG. 16), male and female portions of a socket, an adhesive, an underfill material, and/or any other suitable electrical and/or mechanical coupling structure.

The package-on-interposer structure 1636 may include an IC package 1620 coupled to an interposer 1604 by coupling components 1618. The coupling components 1618 may take any suitable form for the application, such as the forms discussed above with reference to the coupling components 1616. Although a single IC package 1620 is shown in FIG. 16, multiple IC packages may be coupled to the interposer 1604; indeed, additional interposers may be coupled to the interposer 1604. The interposer 1604 may provide an intervening substrate used to bridge the circuit board 1602 and the IC package 1620. The IC package 1620 may be or include, for example, a die (the die 1302 of FIG. 13), an IC device (e.g., the IC device 1400 of FIG. 14), or any other suitable component. Generally, the interposer 1604 may spread a connection to a wider pitch or reroute a connection to a different connection. For example, the interposer 1604 may couple the IC package 1620 (e.g., a die) to a set of BGA conductive contacts of the coupling components 1616 for coupling to the circuit board 1602. In the example illustrated in FIG. 16, the IC package 1620 and the circuit board 1602 are attached to opposing sides of the interposer 1604; in other examples, the IC package 1620 and the circuit board 1602 may be attached to a same side of the interposer 1604. In some examples, three or more components may be interconnected by way of the interposer 1604.

In some examples, the interposer 1604 may be formed as a PCB, including multiple metal layers separated from one another by layers of dielectric material and interconnected by electrically conductive vias. In some examples, the interposer 1604 may be formed of an epoxy resin, a fiberglass-reinforced epoxy resin, an epoxy resin with inorganic fillers, a ceramic material, or a polymer material such as polyimide. In some examples, the interposer 1604 may be formed of alternate rigid or flexible materials that may include the same materials described above for use in a semiconductor substrate, such as silicon, germanium, and other group III-V and group IV materials. The interposer 1604 may include metal interconnects 1608 and vias 1610, including but not limited to through-silicon vias (TSVs) 1606. The interposer 1604 may further include embedded devices 1614, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 1604. The package-on-interposer structure 1636 may take the form of any of the package-on-interposer structures known in the art.

The IC device assembly 1600 may include an IC package 1624 coupled to the first face 1640 of the circuit board 1602 by coupling components 1622. The coupling components 1622 may take the form of any of the examples discussed above with reference to the coupling components 1616, and the IC package 1624 may take the form of any of the examples discussed above with reference to the IC package 1620.

The IC device assembly 1600 illustrated in FIG. 16 includes a package-on-package structure 1634 coupled to the second face 1642 of the circuit board 1602 by coupling components 1628. The package-on-package structure 1634 may include a first IC package 1626 and a second IC package 1632 coupled together by coupling components 1630 such that the first IC package 1626 is disposed between the circuit board 1602 and the second IC package 1632. The coupling components 1628, 1630 may take the form of any of the examples of the coupling components 1616 discussed above, and the IC packages 1626, 1632 may take the form of any of the examples of the IC package 1620 discussed above. The package-on-package structure 1634 may be configured in accordance with any of the package-on-package structures known in the art.

Figure 17:
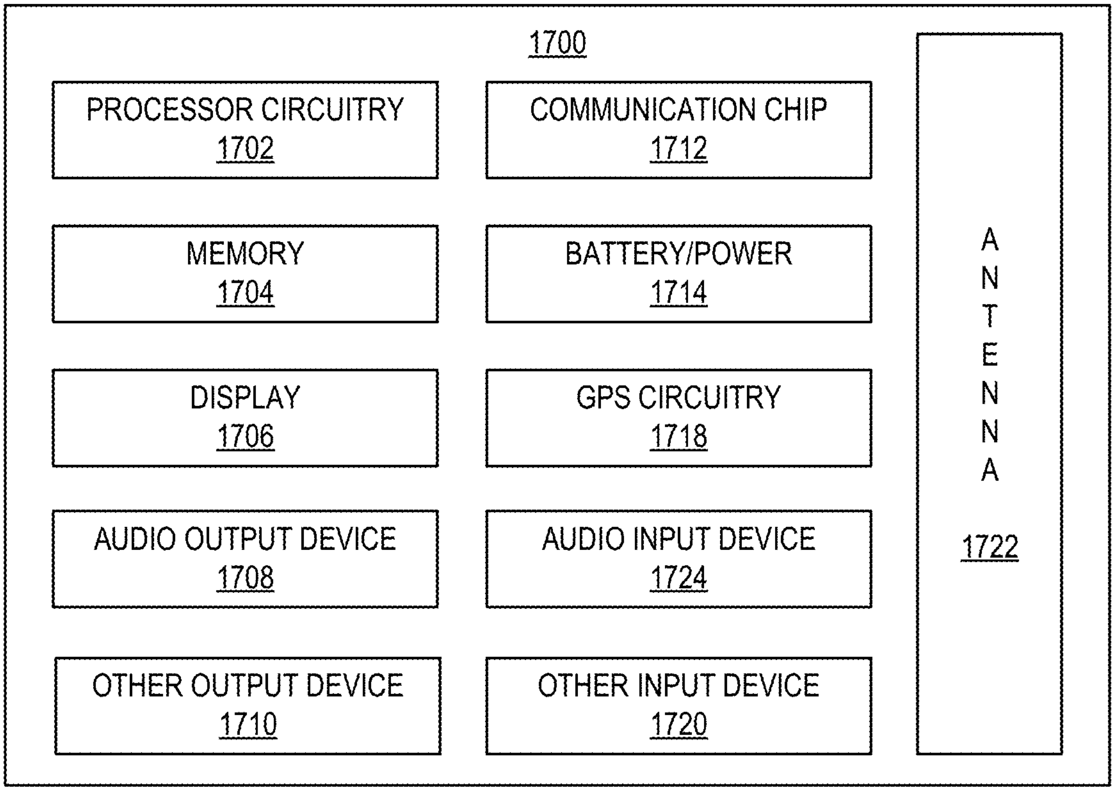
FIG. 17 is a block diagram of an example electrical device that may include an example optical assembly constructed in accordance with teachings disclosed herein.

FIG. 17 is a block diagram of an example electrical device 1700 that may include one or more of the example optical assembly 100. For example, any suitable ones of the components of the electrical device 1700 may include one or more of the device assemblies 1600, IC devices 1400, or dies 1302 disclosed herein, and may be arranged to couple to the example optical assembly 100. A number of components are illustrated in FIG. 17 as included in the electrical device 1700, but any one or more of these components may be omitted or duplicated, as suitable for the application. In some examples, some or all of the components included in the electrical device 1700 may be attached to one or more motherboards. In some examples, some or all of these components are fabricated onto a single system-on-a-chip (SoC) die.

Additionally, in various examples, the electrical device 1700 may not include one or more of the components illustrated in FIG. 17, but the electrical device 1700 may include interface circuitry for coupling to the one or more components. For example, the electrical device 1700 may not include a display 1706, but may include display interface circuitry (e.g., a connector and driver circuitry) to which a display 1706 may be coupled. In another set of examples, the electrical device 1700 may not include an audio input device 1724 (e.g., microphone) or an audio output device 1708 (e.g., a speaker, a headset, earbuds, etc.), but may include audio input or output device interface circuitry (e.g., connectors and supporting circuitry) to which an audio input device 1724 or audio output device 1708 may be coupled.

The electrical device 1700 may include a processor circuitry 1702 (e.g., one or more processing devices). As used herein, the term "processing device" or "processor" may refer to any device or portion of a device that processes electronic data from registers and/or memory to transform that electronic data into other electronic data that may be stored in registers and/or memory. The processor circuitry 1702 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices. The electrical device 1700 may include a memory 1704, which may itself include one or more memory devices such as volatile memory (e.g., dynamic random access memory (DRAM)), nonvolatile memory (e.g., read-only memory (ROM)), flash memory, solid state memory, and/or a hard drive. In some examples, the memory 1704 may include memory that shares a die with the processor circuitry 1702. This memory may be used as cache memory and may include embedded dynamic random access memory (eDRAM) or spin transfer torque magnetic random access memory (STT-MRAM).

In some examples, the electrical device 1700 may include a communication chip 1712 (e.g., one or more communication chips). For example, the communication chip 1712 may be configured for managing wireless communications for the transfer of data to and from the electrical device 1700. The term “wireless” and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some examples they might not.

The communication chip 1712 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as “3GPP2”), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1712 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1712 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1712 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1712 may operate in accordance with other wireless protocols in other examples. The electrical device 1700 may include an antenna 1722 to facilitate wireless communications and/or to receive other wireless communications (such as AM or FM radio transmissions).

In some examples, the communication chip 1712 may manage wired communications, such as electrical, optical, or any other suitable communication protocols (e.g., the Ethernet). As noted above, the communication chip 1712 may include multiple communication chips. For instance, a first communication chip 1712 may be dedicated to shorter-range wireless communications such as Wi-Fi or Bluetooth, and a second communication chip 1712 may be dedicated to longer-range wireless communications such as global positioning system (GPS), EDGE, GPRS, CDMA, WiMAX, LTE, EV-DO, or others. In some examples, a first communication chip 1712 may be dedicated to wireless communications, and a second communication chip 1712 may be dedicated to wired communications.

The electrical device 1700 may include battery/power circuitry 1714. The battery/power circuitry 1714 may include one or more energy storage devices (e.g., batteries or capacitors) and/or circuitry for coupling components of the electrical device 1700 to an energy source separate from the electrical device 1700 (e.g., AC line power).

The electrical device 1700 may include a display 1706 (or corresponding interface circuitry, as discussed above). The display 1706 may include any visual indicators, such as a heads-up display, a computer monitor, a projector, a touchscreen display, a liquid crystal display (LCD), a light-emitting diode display, or a flat panel display.

The electrical device 1700 may include an audio output device 1708 (or corresponding interface circuitry, as discussed above). The audio output device 1708 may include any device that generates an audible indicator, such as speakers, headsets, or earbuds.

The electrical device 1700 may include an audio input device 1724 (or corresponding interface circuitry, as discussed above). The audio input device 1724 may include any device that generates a signal representative of a sound, such as microphones, microphone arrays, or digital instruments (e.g., instruments having a musical instrument digital interface (MIDI) output).

The electrical device 1700 may include a GPS circuitry 1718. The GPS circuitry 1718 may be in communication with a satellite-based system and may receive a location of the electrical device 1700, as known in the art.

The electrical device 1700 may include any other output device 1710 (or corresponding interface circuitry, as discussed above). Examples of the other output device 1710 may include an audio codec, a video codec, a printer, a wired or wireless transmitter for providing information to other devices, or an additional storage device.

The electrical device 1700 may include any other input device 1720 (or corresponding interface circuitry, as discussed above). Examples of the other input device 1720 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1700 may have any desired form factor, such as a hand-held or mobile electrical device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop electrical device, a server or other networked computing component, a printer, a scanner, a monitor, a set-top box, an entertainment control unit, a vehicle control unit, a digital camera, a digital video recorder, or a wearable electrical device. In some examples, the electrical device 1700 may be any other electronic device that processes data.

From the foregoing, it will be appreciated that example systems, methods, apparatus, and articles of manufacture have been disclosed that enable customization of pigtail lengths of optical connectors. Additionally, using the example systems, methods, apparatus, and articles of manufactures disclosed herein creates customizable optical connectors without significant link losses by enabling high precision creation and alignment of the optical connectors.

Example methods, apparatus, systems, and articles of manufacture to enable customization of pigtail lengths of optical connectors are disclosed herein. Further examples and combinations thereof include the following:

Example 1 includes an apparatus comprising an affixed fiber array unit plug including a first optical fiber, a detachable fiber array unit plug including a second optical fiber, the detachable fiber array unit plug to be removably coupled to the affixed fiber array unit plug, and guide pins to interface with both the detachable fiber array unit plug and the affixed fiber array unit plug when coupled together, the guide pins to facilitate alignment of the first optical fiber with the second optical fiber.

Example 2 includes the apparatus of example 1, wherein the affixed fiber array unit plug is bonded to an optical component via the first optical fiber.

Example 3 includes the apparatus of example 1, wherein the detachable fiber array unit plug is bonded to a mechanical transfer ferrule via the second optical fiber.

Example 4 includes the apparatus of example 3, wherein the affixed fiber array unit plug includes a third optical fiber, and the detachable fiber array unit plug includes a fourth optical fiber to align with the third optical fiber, the second and fourth optical fibers arranged in a first array on the detachable fiber array unit plug and arranged in a second array on the mechanical transfer ferrule, an ordering of the second and fourth optical fibers in the first array different than an ordering of the second and fourth optical fibers in the second array.

Example 5 includes the apparatus of example 1, wherein the affixed fiber array unit plug includes a first groove, and the detachable fiber array unit plug includes a second groove, the first optical fiber disposed in the first groove, the second optical fiber disposed in the second groove.

Example 6 includes the apparatus of example 1, wherein the affixed fiber array unit plug and the detachable fiber array unit plug include grooves to interface with the guide pins.

Example 7 includes the apparatus of example 1, further including a retention mechanism to retain the detachable fiber array unit plug in engagement with the affixed fiber array unit plug, and to retain detachable fiber array unit plug and the affixed fiber array unit plug against the guide pins.

Example 8 includes the apparatus of example 7, wherein the guide pins are bonded to the retention mechanism.

Example 9 includes the apparatus of example 7, further including an alignment casing to support the guide pins.

Example 10 includes the apparatus of example 9, wherein the retention mechanism surrounds the detachable fiber array unit plug, the affixed fiber array unit plug, and the alignment casing.

Example 11 includes the apparatus of example 7, wherein the guide pins are longer than a combined length of the affixed fiber array unit plug and the detachable fiber array unit plug.

Example 12 includes the apparatus of example 7, wherein the retention mechanism includes a release mechanism that, when released, provides a compressive force to urge the detachable fiber array unit plug and the affixed fiber array unit plug against the guide pins, and when squeezed, removes the compressive force.

Example 13 includes the apparatus of example 12 further including a spring positioned between a distal end of the detachable fiber array unit plug and the retention mechanism, the spring to provide an axial retention force to facilitate engagement of the detachable fiber array unit plug to the affixed fiber array unit plug.

Example 14 includes the apparatus of example 12, wherein the retention mechanism attaches to a slot on an optical component.

Example 15 includes the apparatus of example 7, wherein the retention mechanism includes a spring to urge at least one of the detachable fiber array unit plug or the affixed fiber array unit plug against the guide pins, the spring to removably attach to an optical component.

Example 16 includes the apparatus of example 1, wherein the detachable fiber array unit plug is replaceable.

Example 17 includes the apparatus of example 1, wherein a length of the second optical fiber is customizable independent of a length of the first optical fiber.

Example 18 includes the apparatus of example 1, wherein the affixed fiber array unit plug includes a first unique identifier disposed thereon and the detachable fiber array unit plug includes a second unique identifier disposed thereon, the first unique identifier the same as the second unique identifier.

Example 19 includes a method comprising attaching optical fibers to a first ferrule, the first ferrule positioned between first and second ends of the optical fibers, attaching the first ends of the optical fibers to a second ferrule, and cutting the first ferrule and the optical fibers to obtain an affixed fiber array unit plug and a detachable fiber array unit plug.

Example 20 includes the method of example 19, further including aligning, using guide pins, the optical fibers on the affixed fiber array unit plug to the optical fibers on the detachable fiber array unit plug.

Example 21 includes the method of example 20, further including retaining the alignment of the optical fibers with a retention mechanism.

Example 22 includes the method of example 19, further including adding an identifier to the affixed fiber array unit plug and the detachable fiber array unit plug.

Example 23 includes the method of example 19, further including bonding the second ends of the optical fibers to an optical component.

Example 24 includes the method of example 19, wherein the detachable fiber array unit plug is a first detachable fiber array unit plug, the method further including coupling the first detachable fiber array unit plug to the affixed fiber array unit plug with a retention mechanism at a first point in time, and replacing the first detachable fiber array unit plug with a second detachable fiber array unit plug.

Example 25 includes an apparatus comprising first means for supporting a first array of optical fibers, second means for supporting a second array of optical fibers, the second supporting means separable from the first supporting means, and means for aligning the first array of optical fibers to the second array of optical fibers.

Example 26 includes the apparatus of example 25, further including means for retaining the first and second supporting means in engagement with the aligning means.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:

an affixed fiber array unit plug including a first optical fiber, the first optical fiber extending along a first exterior surface of the affixed fiber array unit plug, the first optical fiber extending between opposite ends of the affixed fiber array unit plug;

a detachable fiber array unit plug including a second optical fiber, the second optical fiber extending along a second exterior surface of the detachable fiber array unit plug, the second optical fiber extending between opposite ends of the detachable fiber array unit plug, the detachable fiber array unit plug to be removably coupled to the affixed fiber array unit plug; and guide pins to interface with both the first and second exterior surfaces when the detachable fiber array unit plug and the affixed fiber array unit plug are coupled together, the guide pins to facilitate alignment of the first optical fiber with the second optical fiber.

2. The apparatus of claim 1, wherein the affixed fiber array unit plug is bonded to an optical component via the first optical fiber.

3. The apparatus of claim 1, wherein the detachable fiber array unit plug is bonded to a mechanical transfer ferrule via the second optical fiber.

4. The apparatus of claim 3, wherein the affixed fiber array unit plug includes a third optical fiber, and the detachable fiber array unit plug includes a fourth optical fiber to align with the third optical fiber, the second and fourth optical fibers arranged in a first array on the detachable fiber array unit plug and arranged in a second array on the mechanical transfer ferrule, an ordering of the second and fourth optical fibers in the first array different than an ordering of the second and fourth optical fibers in the second array.

5. The apparatus of claim 1, wherein the affixed fiber array unit plug includes a first groove along the first exterior surface, and the detachable fiber array unit plug includes a second groove along the second exterior surface, the first optical fiber in the first groove, the second optical fiber in the second groove.

6. The apparatus of claim 1, wherein the affixed fiber array unit plug and the detachable fiber array unit plug include grooves along the respective first exterior surface and the second exterior surface, the grooves to interface with the guide pins.

7. The apparatus of claim 1, including a retention mechanism to retain the detachable fiber array unit plug in engagement with the affixed fiber array unit plug, and to retain the detachable fiber array unit plug and the affixed fiber array unit plug against the guide pins.

8. The apparatus of claim 7, wherein the guide pins are bonded to the retention mechanism.

9. The apparatus of claim 7, including an alignment casing to support the guide pins.

10. The apparatus of claim 9, wherein the retention mechanism surrounds the detachable fiber array unit plug, the affixed fiber array unit plug, and the alignment casing.

11. The apparatus of claim 7, wherein the guide pins are at least as long as a combined length of the affixed fiber array unit plug and the detachable fiber array unit plug.

12. The apparatus of claim 7, wherein the retention mechanism includes a release mechanism that, when released, provides a compressive force to urge the detachable fiber array unit plug and the affixed fiber array unit plug against the guide pins, and when squeezed, removes the compressive force.

13. The apparatus of claim 12, including a spring between a distal end of the detachable fiber array unit plug and the retention mechanism, the spring to provide an axial retention force to facilitate engagement of the detachable fiber array unit plug to the affixed fiber array unit plug.

14. The apparatus of claim 12, wherein the retention mechanism attaches to a slot on an optical component.

15. The apparatus of claim 7, wherein the retention mechanism includes a spring to urge at least one of the detachable fiber array unit plug or the affixed fiber array unit plug against the guide pins, the spring to removably attach to an optical component.

16. The apparatus of claim 1, wherein the detachable fiber array unit plug is replaceable.

17. The apparatus of claim 1, wherein a length of the second optical fiber is customizable independent of a length of the first optical fiber.

18. The apparatus of claim 1, wherein the affixed fiber array unit plug includes a first unique identifier disposed thereon and the detachable fiber array unit plug includes a second unique identifier disposed thereon, the first unique identifier the same as the second unique identifier.

19. A method to manufacture the affixed fiber array unit plug and a detachable fiber array unit plug of claim 1, the method comprising:

attaching optical fibers to a first ferrule, the first ferrule between first and second ends of the optical fibers;

attaching the first ends of the optical fibers to a second ferrule; and cutting the first ferrule and the optical fibers to obtain the affixed fiber array unit plug and the detachable fiber array unit plug.

20. The apparatus of claim 1, wherein the first optical fiber terminates at a first interfacing surface of the affixed fiber array unit plug, and the second optical fiber terminates at a second interfacing surface of the detachable fiber array unit plug, the first and second interfacing surfaces to face one another when the detachable fiber array unit plug is coupled to the affixed fiber array unit plug, the guide pins to span across an interface between the first and second interfacing surfaces.

* * * * *